US011509772B2

(12) United States Patent
Leung

(10) Patent No.: US 11,509,772 B2
(45) Date of Patent: Nov. 22, 2022

(54) METHODS FOR INCREASING VOICE-OVER-INTERNET PROTOCOL (VOIP) NETWORK COVERAGE

(71) Applicant: QUALCOMM Incorporated, San Diego, CA (US)

(72) Inventor: Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/672,403

(22) Filed: Nov. 1, 2019

(65) Prior Publication Data

US 2020/0153972 A1 May 14, 2020

Related U.S. Application Data

(60) Provisional application No. 62/774,634, filed on Dec. 3, 2018, provisional application No. 62/760,717, filed on Nov. 13, 2018.

(51) Int. Cl.
*H04M 7/00* (2006.01)
*H04L 65/80* (2022.01)
(Continued)

(52) U.S. Cl.
CPC ...... *H04M 7/0072* (2013.01); *H04L 43/0841* (2013.01); *H04L 65/80* (2013.01);
(Continued)

(58) Field of Classification Search
None
See application file for complete search history.

(56) References Cited

U.S. PATENT DOCUMENTS 7,251,241 B1 * 7/2007 Jagadeesan ....... H04L 29/06027
370/352
9,338,580 B2 5/2016 Swaminathan et al.
(Continued)

FOREIGN PATENT DOCUMENTS

CN 1852230 A 10/2006
CN 101180822 A 5/2008
(Continued)

OTHER PUBLICATIONS

QUALCOMM Incorporated: "eVoLP: The Robustness Index," S4-170263, 3GPP TSG-SA4 Meeting #93, Busan, South Korea, Apr. 24-28, 2017, pp. 1-2.
(Continued)

*Primary Examiner* — Gregory B Sefcheck
*Assistant Examiner* — Suk Jin Kang
(74) *Attorney, Agent, or Firm* — Muncy, Geissler, Olds & Lowe, P.C.

(57) ABSTRACT

The disclosure generally relates to various methods to increase network coverage for a Voice-over-Internet Protocol (VoIP) session between a first user equipment (UE) and a second UE. In an aspect, a first and second UEs negotiate a codec configuration to use in the VoIP session, transmits, to the second UE, a maximum end-to-end packet loss rate (PLR) that the first UE can tolerate for received media given the negotiated codec configuration, receives, from the second UE, a maximum end-to-end PLR that the second UE can tolerate for received media given the negotiated codec configuration, and determines a distribution of the maximum end-to-end PLRs among respective uplinks and downlinks at the first UE and the second UE.

31 Claims, 10 Drawing Sheets

(51) Int. Cl.
*H04L 69/24* (2022.01)
*H04L 43/0829* (2022.01)
*H04W 36/00* (2009.01)
*H04W 24/08* (2009.01)

(52) U.S. Cl.
CPC ............. *H04L 69/24* (2013.01); *H04W 24/08* (2013.01); *H04W 36/0022* (2013.01); *H04W 36/0094* (2013.01)

(56) References Cited

U.S. PATENT DOCUMENTS

| | | | | |
|---|---|---|---|---|
| 2007/0127509 | A1* | 6/2007 | Lin | H04L 65/80 370/401 |
| 2008/0317065 | A1* | 12/2008 | Chen | H04M 7/0072 370/469 |
| 2011/0141890 | A1* | 6/2011 | Giaretta | H04L 65/1069 370/232 |
| 2013/0215774 | A1* | 8/2013 | Bender | H04W 88/181 370/252 |
| 2014/0376545 | A1* | 12/2014 | Hua | H04L 65/80 370/352 |
| 2015/0092585 | A1 | 4/2015 | Shao et al. | |
| 2017/0026878 | A1* | 1/2017 | Hori | H04L 65/1006 |
| 2017/0187774 | A1* | 6/2017 | Qiu | H04L 43/0894 |
| 2017/0295530 | A1* | 10/2017 | Chen | H04W 80/10 |
| 2018/0352092 | A1* | 12/2018 | Rajendran | H04L 65/80 |
| 2019/0045578 | A1* | 2/2019 | Oyman | H04L 65/607 |
| 2019/0182741 | A1* | 6/2019 | Oyman | H04M 15/851 |
| 2019/0215729 | A1* | 7/2019 | Oyman | H04L 65/80 |
| 2019/0274186 | A1* | 9/2019 | Oyman | H04W 80/10 |
| 2019/0373511 | A1* | 12/2019 | Oyman | H04W 76/28 |
| 2020/0045587 | A1* | 2/2020 | Choi | H04L 65/102 |
| 2020/0374743 | A1* | 11/2020 | Xin | H04L 29/08 |

FOREIGN PATENT DOCUMENTS

| | | |
|---|---|---|
| CN | 101180843 A | 5/2008 |
| CN | 101467472 A | 6/2009 |
| CN | 102868576 A | 1/2013 |
| JP | 2018527844 A | 9/2018 |
| WO | 2013059499 A2 | 4/2013 |
| WO | 2017015948 A1 | 2/2017 |
| WO | 2018108813 A1 | 6/2018 |

OTHER PUBLICATIONS

QUALCOMM Incorporated: "On eNB Awareness of EVS Codec for Coverage and mobility Enhancements," R2-165194, 3GPP TSG-RAN2 meeting #95, Gothenburg, Sweden, Aug. 22-26, 2016, pp. 1-11.

3GPP TSG SA WG4: "LS on FS_eVoLP" [online], 3GPP Draft, 3GPP TSG RAN WG2 #101bis, R2-1806361 (Tdoc S4-180631), Sanya, China, Apr. 16-20, 2018, 39 Pages, Retrieved from the Internet: URL: http://www.3gpp.org/ftp/tsg_ran/WG2_RL2/TSGR2_101bis/Docs/R2-1806361.zip.

3rd Generation Partnership Project, Technical Specification Group Services and System Aspects, Study for Enhanced VoLTE Performance (Release 15), 3GPP TR 23.759 V0.2.0 (Feb. 2017), Mar. 1, 2017, 13 Pages, Retrieved from the Internet: URL: https://www.3gpp.org/ftp/Specs/archive/23_series/23.759.

3rd Generation Partnership Project: Technical Specification Group Services and System Aspects; Study on Enhanced Voice Over LTE (VoLTE) Performance (Release 15)', 3GPP Draft, 3GPP TR 26.959 V15.0.0, 26959-FOO, 3rd Generation Partnership Project (3GPP), Mobile Competence Centre, 650, Route Des Lucioles, F-06921, Sophia-Antipolis Cedex, France, Jun. 22, 2018 (Jun. 22, 2018), XP051542105, Retrieved from the Internet: URL: http://www.3gpp.org/ftp/tsg%5Fsa/WG4%5FCODEC/Specs%5Fupdate%5Fafter%5FSA80/26959%2Df00%2Ezip [retrieved Cite No. 1 . . . on Jun. 22, 2018], the whole document.

Intel: "eVoLP: Impact of JBM and PLC on Handover Thresholds", 3GPP Draft, 3GPP TSG-SA4 Meeting #95, S4-170772_EVOLP JBM_PLC, 3rd Generation Partnership Project (3GPP), Mobile Competence Centre; 650, Route Des Lucioles; F-06921 Sophia-Antipolis Cedex; France, vol. SA WG4, No. Belgrade, Serbia; Oct. 9, 2017-Oct. 13, 2017, Oct. 6, 2017, XP051348483, Retrieved from the Internet: URL:http://www.3gpp.org/ftp/Meetings_3GPP_SYNC/SA4/Docs/ [retrieved on Oct. 6, 2017], 2 pages, the whole document.

International Search Report and Written Opinion—PCT/US2019/060104—ISA/EPO—dated Apr. 8, 2020.

* cited by examiner

METHODS FOR INCREASING VOICE-OVER-INTERNET PROTOCOL (VOIP) NETWORK COVERAGE

CROSS-REFERENCE TO RELATED APPLICATIONS

The present application is related to U.S. application Ser. No. 15/954,587, entitled "METHODS FOR INCREASING VOIP NETWORK COVERAGE, filed Apr. 16, 2018. The present application claims priority to U.S. Provisional Application No. 62/760,717, entitled "METHODS FOR INCREASING VOIP NETWORK COVERAGE," filed Nov. 13, 2018, and to U.S. Provisional Application No. 62/774,634, entitled "METHODS FOR INCREASING VOIP NETWORK COVERAGE," filed Dec. 3, 2018, each of which is assigned to the assignee hereof, and each of which is expressly incorporated by reference in its entirety.

TECHNICAL FIELD

The various aspects described herein generally relate to wireless communications, and in particular, to increasing network coverage for voice-over-Internet protocol (VoIP) sessions and/or other voice-based multimedia services.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high-speed data and Internet-capable wireless services. There are many wireless communication systems in use, including cellular and personal communications service (PCS) systems. Exemplary cellular systems include the cellular Analog Advanced Mobile Phone System (AMPS), digital cellular systems based on code division multiple access (CDMA), frequency division multiple access (FDMA), time division multiple access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as enhanced data rates for GSM evolution (EDGE) and universal mobile telecommunications system (UMTS) protocols such as high-speed packet access (HSPA).

A fifth generation (5G) mobile standard, referred to as New Radio (NR), is currently being formulated and calls for higher data transfer speeds, greater numbers of connections, and better coverage, among other improvements. The 5G standard, according to the Next Generation Mobile Networks Alliance, is expected to provide data rates of several tens of megabits per second to each of tens of thousands of users, with one gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

According to various aspects, the disclosure generally relates to various methods to increase network coverage with respect to VoIP sessions and/or other voice-based multimedia services. In particular, when establishing a voice session, two or more terminals may perform a codec negotiation to exchange information related to supported multimedia codecs and/or codec modes, jitter buffer management (JBM), and packet loss concealment (PLC) capabilities. Based on the exchanged information, a message may be sent to a base station to indicate the maximum packet loss rate (PLR) for each terminal. Additional techniques may ensure that the terminals use the most robust codecs or codec modes that are available when nearing the edge of coverage to help avoid unnecessary and/or excessive handovers.

For example, according to various aspects, a method for increasing network coverage for a VoIP session between a first user equipment (UE) and a second UE may comprise negotiating, between the first UE and the second UE, a codec configuration to use in the VoIP session between the first UE and the second UE, transmitting, by the first UE to the second UE, a maximum end-to-end PLR that the first UE can tolerate for received media given the negotiated codec configuration, receiving, at the first UE from the second UE, a maximum end-to-end PLR that the second UE can tolerate for received media given the negotiated codec configuration, and negotiating, at the first UE, a distribution of the maximum end-to-end PLRs among respective uplinks and downlinks at the first UE and the second UE, and, optionally, transmitting, by the first UE to a serving base station, a message to request a maximum uplink PLR for media transmitted in a direction from the first UE to the second UE and a maximum downlink PLR for media transmitted in a direction from the second UE to the first UE according to the determined distribution.

According to various aspects, another method for increasing network coverage for a VoIP session between a first UE and a second UE may comprise monitoring, by a network entity serving the first UE, a codec configuration negotiation between the first UE and the second UE, wherein the codec configuration negotiation includes an exchange of maximum end-to-end PLRs that the first UE and the second UE can tolerate for received media based at least in part on the negotiated codec configuration, wherein the maximum end-to-end PLRs may be further based on respective PLC and JBM implementations in use at the first UE and the second UE, determining, by the network entity, an agreed-upon distribution of the maximum end-to-end PLRs among respective uplinks and downlinks at the first UE and the second UE, and transmitting, by the network entity to a base station serving the first UE, a message to request a maximum uplink PLR for media transmitted in a direction from the first UE to the second UE and a maximum downlink PLR for media transmitted in a direction from the second UE to the first UE according to the agreed-upon distribution. The base station serving the first UE may therefore be configured to establish a handover threshold for the VoIP session (e.g., a single radio voice call continuity (SRVCC) threshold) based at least in part on the requested uplink PLR and the requested downlink PLR.

According to various aspects, an apparatus for increasing network coverage for a VoIP session between a first UE and a second UE includes a memory of the first UE, a communication device of the first UE, and at least one processor of the first UE coupled to the memory, the at least one processor configured to: negotiate, with the second UE, a codec configuration to use in the VoIP session between the first UE and the second UE, cause the communication device to transmit, to the second UE, a maximum end-to-end PLR that the first UE can tolerate for received media given the negotiated codec configuration, receive, from the second UE via the communication device, a maximum end-to-end PLR that the second UE can tolerate for received media given the negotiated codec configuration, and negotiate a distribution of the maximum end-to-end PLRs among respective uplinks and downlinks at the first UE and the second UE.

According to various aspects, another apparatus for increasing network coverage for a VoIP session between a first UE and a second UE includes a memory of a network entity serving the first UE, at least one processor of the network entity coupled to the memory, the at least one processor configured to: monitor a codec configuration negotiation between the first UE and the second UE, wherein the codec configuration negotiation includes an exchange of maximum end-to-end PLRs that the first UE and the second UE can tolerate for received media based at least in part on the negotiated codec configuration, determine an agreed-upon distribution of the maximum end-to-end PLRs among respective uplinks and downlinks, and cause a communication device of the network entity to transmit, to a base station serving the first UE, a message to request a maximum uplink PLR for media transmitted in a direction from the first UE to the second UE and a maximum downlink PLR for media transmitted in a direction from the second UE to the first UE according to the agreed-upon distribution.

According to various aspects, another apparatus for increasing network coverage for a VoIP session between a first UE and a second UE includes means of the first UE for negotiating, with the second UE, a codec configuration to use in the VoIP session between the first UE and the second UE, means of the first UE for transmitting, to the second UE, a maximum end-to-end PLR that the first UE can tolerate for received media given the negotiated codec configuration, means of the first UE for receiving, at the first UE from the second UE, a maximum end-to-end PLR that the second UE can tolerate for received media given the negotiated codec configuration, and means of the first UE for negotiating a distribution of the maximum end-to-end PLRs among respective uplinks and downlinks at the first UE and the second UE.

According to various aspects, an apparatus for increasing network coverage for a VoIP session between a first UE and a second UE includes means of a network entity serving the first UE for monitoring a codec configuration negotiation between the first UE and the second UE, wherein the codec configuration negotiation includes an exchange of maximum end-to-end PLRs that the first UE and the second UE can tolerate for received media based at least in part on the negotiated codec configuration, means of the network entity for determining an agreed-upon distribution of the maximum end-to-end PLRs among respective uplinks and downlinks, and means of the network entity for transmitting, to a base station serving the first UE, a message to request a maximum uplink PLR for media transmitted in a direction from the first UE to the second UE and a maximum downlink PLR for media transmitted in a direction from the second UE to the first UE according to the agreed-upon distribution.

According to various aspects, a non-transitory computer-readable medium storing computer-executable instructions for increasing network coverage for a VoIP session between a first UE and a second UE includes computer-executable instructions including at least one instruction instructing the first UE to negotiate, with the second UE, a codec configuration to use in the VoIP session between the first UE and the second UE, at least one instruction instructing the first UE to transmit, to the second UE, a maximum end-to-end PLR that the first UE can tolerate for received media given the negotiated codec configuration, at least one instruction instructing the first UE to receive, from the second UE, a maximum end-to-end PLR that the second UE can tolerate for received media given the negotiated codec configuration, and at least one instruction instructing the first UE to determine a distribution of the maximum end-to-end PLRs among respective uplinks and downlinks at the first UE and the second UE.

According to various aspects, a non-transitory computer-readable medium storing computer-executable instructions for increasing network coverage for a VoIP session between a first UE and a second UE includes computer-executable instructions including at least one instruction instructing a network entity serving the first UE to monitor a codec configuration negotiation between the first UE and the second UE, wherein the codec configuration negotiation includes an exchange of maximum end-to-end PLRs that the first UE and the second UE can tolerate for received media based at least in part on the negotiated codec configuration, at least one instruction instructing the network entity determine an agreed-upon distribution of the maximum end-to-end PLRs among respective uplinks and downlinks, and at least one instruction instructing the network entity to transmit, to a base station serving the first UE, a message to request a maximum uplink PLR for media transmitted in a direction from the first UE to the second UE and a maximum downlink PLR for media transmitted in a direction from the second UE to the first UE according to the agreed-upon distribution.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
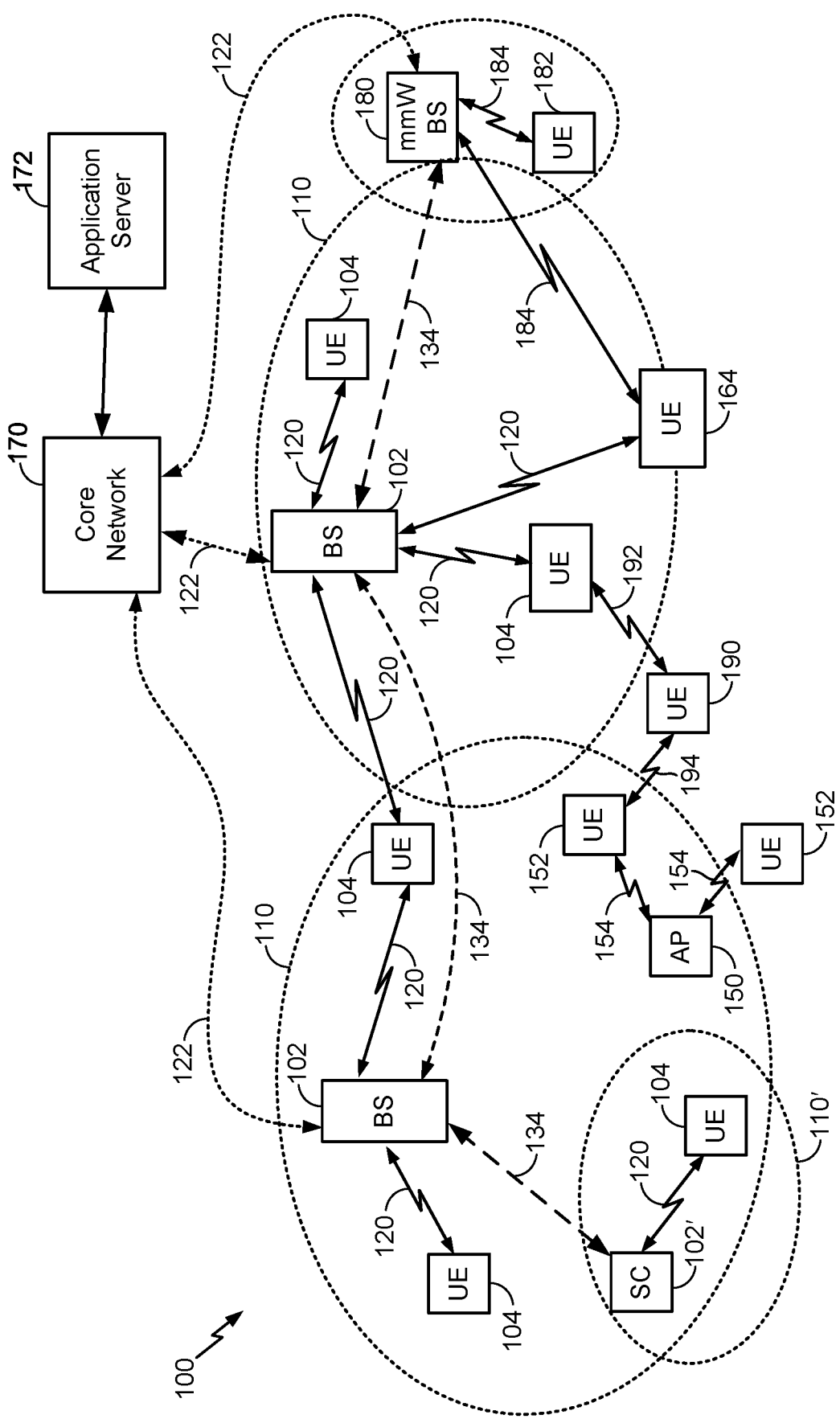
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station. Similarly, references to a TRP are to be understood as also referring to the base station supporting the TRP.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more application servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In NR, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as NR, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
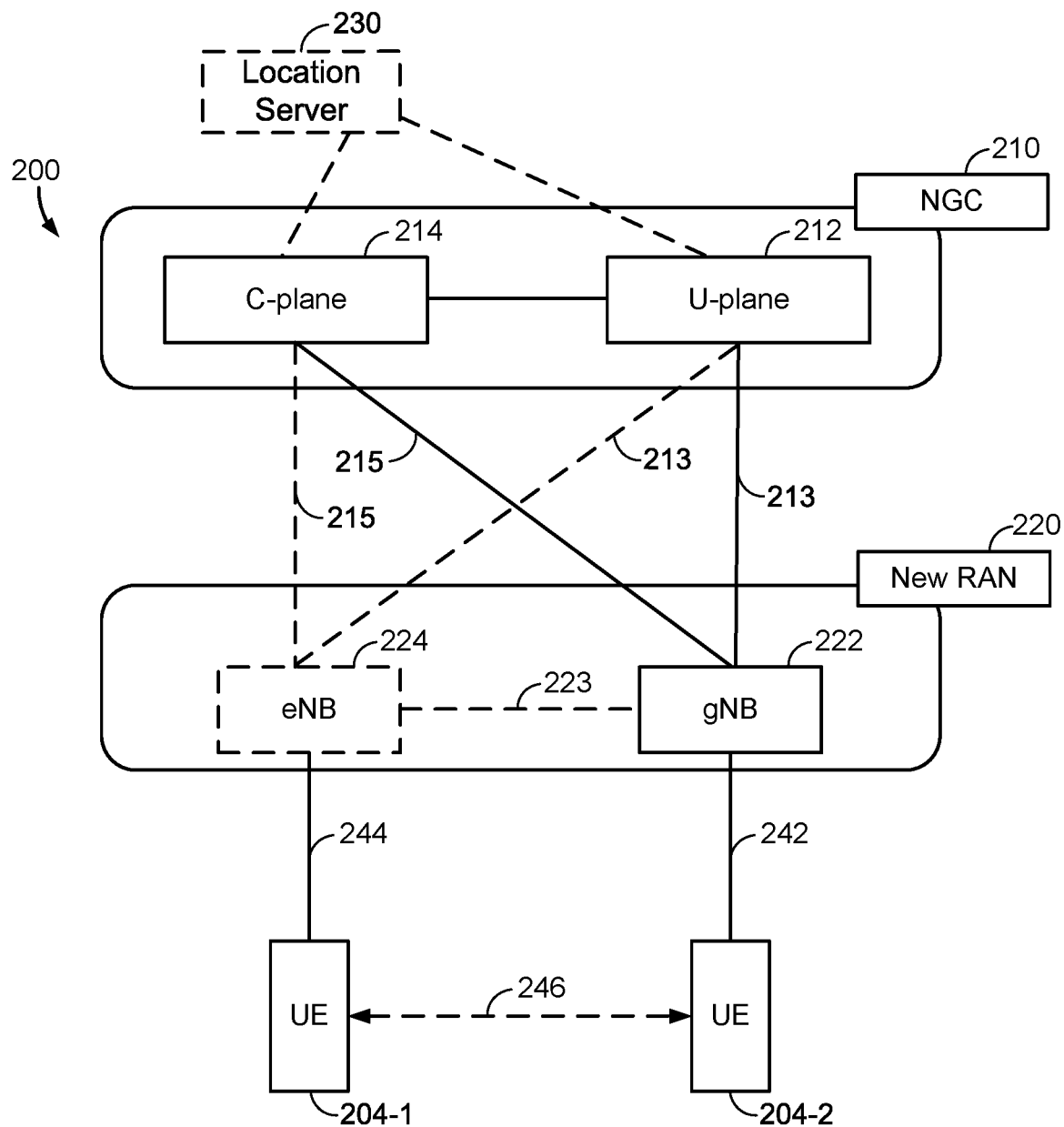
FIGS. 2A and 2B illustrate exemplary wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect a gNB 222 (operating in accordance with NR) to the NGC 210 and specifically to the control plane functions 214 and user plane functions 212. In an additional configuration, an eNB 224 (operating in accordance with LTE) may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222.

In the example of FIG. 2A, eNB 224 and gNB 222 may communicate with UEs 204-1 and 204-2, respectively (e.g., any of the UEs described herein, and collectively UEs 204). The UE 204-1 is connected to the eNB 224 via a communication link 244 (e.g., a communication link 120 established in accordance with LTE), and the UE 204-2 is connected to the gNB 222 via a communication link 242 (e.g., a mmW communication link 184 established in accordance with NR). However, as will be appreciated, the UEs 204 may both be connected to the eNB 224 and/or the gNB 222, or may both be connected to two different eNBs or to two different gNBs.

In various aspects, a UE pair (e.g., UE 204-1 and UE 204-2) may establish a D2D connection 246 to communicate directly without utilizing their respective base stations (e.g., eNB 224, gNB 222). The UE pair 204-1, 204-2 may then transfer data traffic over the D2D connection 246. In general, one or more entities in the network infrastructure (e.g., eNB 224, gNB 222, entities in the NGC 210, etc.) may coordinate the D2D communication between the UEs 204-1, 204-2, in that the network entities may assist in establishing the D2D connection 246, control use in a D2D mode versus a legacy mode, provide security support, etc. In various aspects, the UE pair 204-1, 204-2 may be configured establish the D2D connection 246 autonomously, wherein initial discovery and establishing the D2D connection 246 may be based on an ability to communicate signals directly therebetween.

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
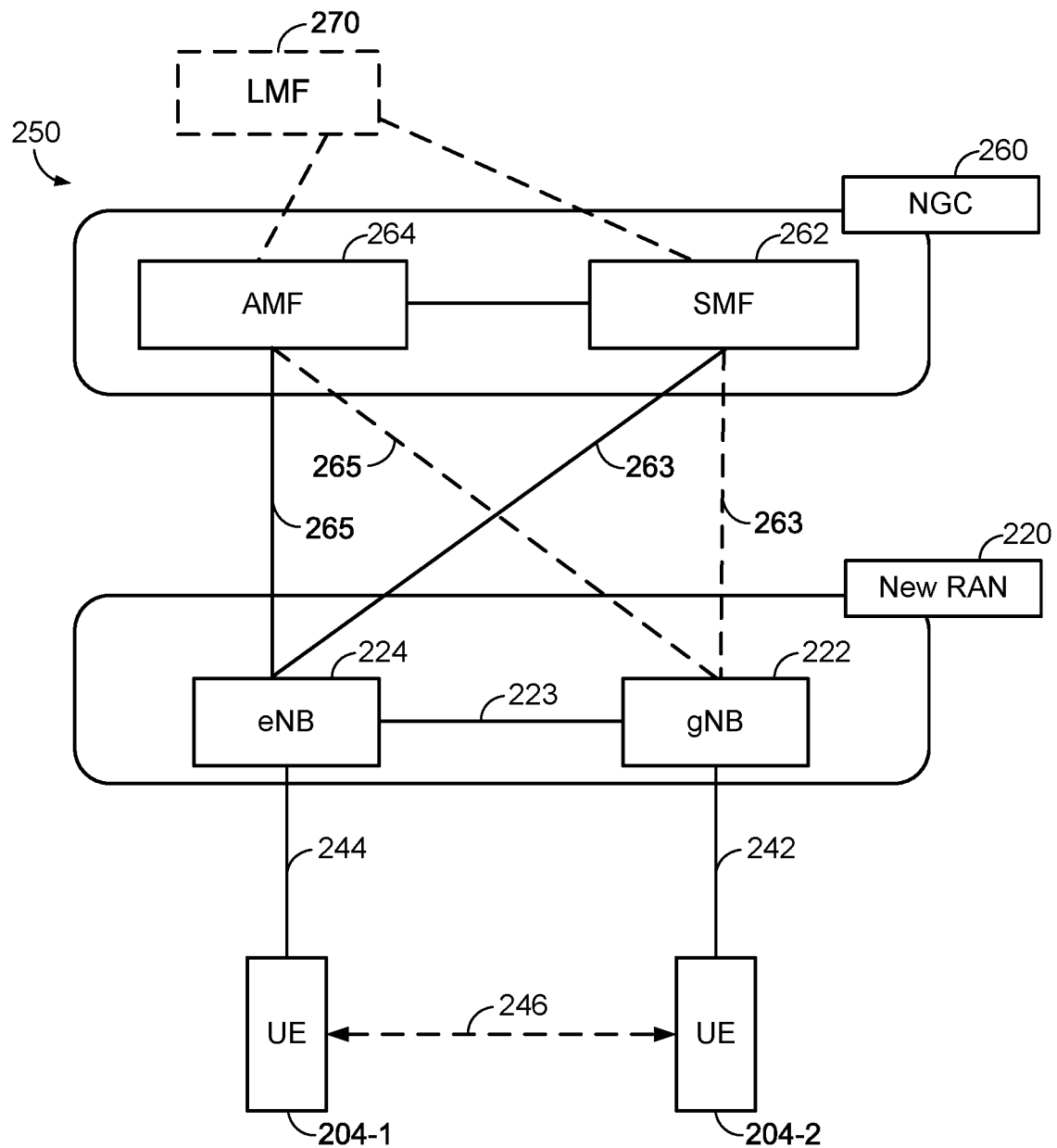

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UEs 204 and the SMF 262, transparent proxy services for routing SM messages, access authentication and access authorization, transport for short message service (SMS) messages between the UEs 204 and the short message service function (SMSF) (not shown), and security anchor functionality (SEAF). The AMF also interacts with the authentication server function (AUSF) (not shown) and the UEs 204, and receives the intermediate key that was established as a result of the UEs 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UEs 204 and the location management function (LMF) 270, as well as between the New RAN 220 and the LMF 270, evolved packet system (EPS) bearer identifier allocation for interworking with the EPS, and UEs 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
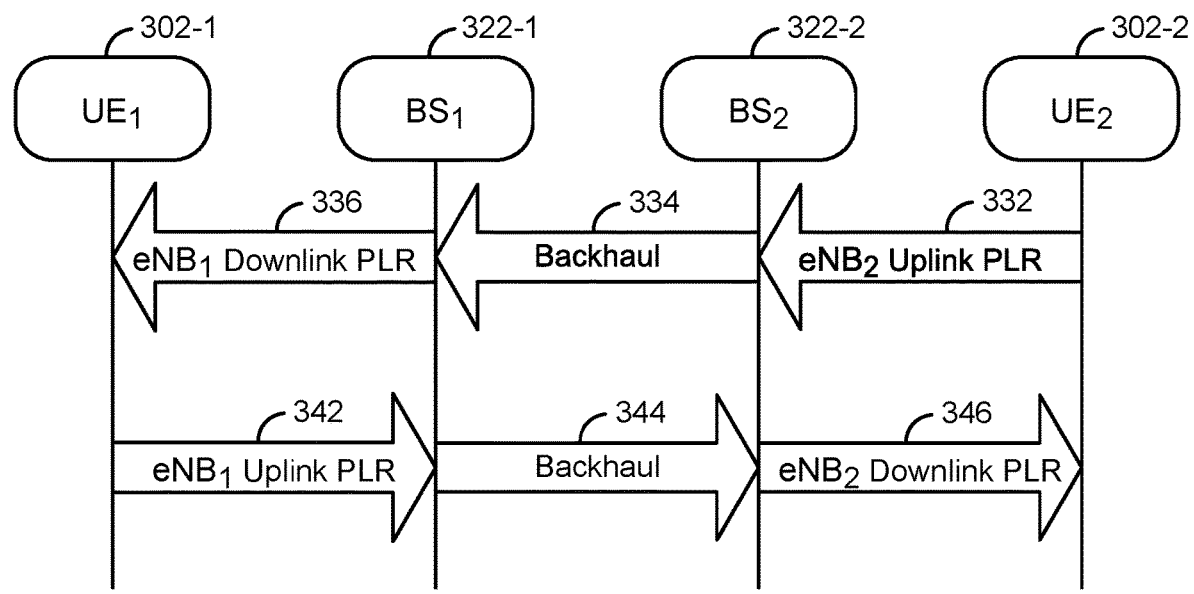
FIG. 3 illustrates an exemplary end-to-end communication flow between two terminals engaged in a voice-based multimedia session, according to various aspects.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such as a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIGs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304, and 306 may include optional positioning entity modules 344, 344, and 358, respectively. The modules 344, 348, and 358 may be hardware circuits that are part of or coupled to the processing systems 332, 334, and 336, respectively, that, when executed, cause the apparatuses 302, 304, and 306 to perform the functionality described herein. Alternatively, the modules 344, 348, and 358 may be memory modules stored in the memory components 338, 340, and 342, respectively, that, when executed by the processing systems 332, 34, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, 342, and 358 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the modules 344, 348, and 358, etc.

When terminals or UEs supporting multimedia (e.g., speech) services reach the edge of network coverage (e.g., the edge of a wireless wide area network (WWAN), such as an LTE network), the network typically examines a handover threshold and decides whether to handoff the terminal to a different radio access technology based on measurement reports from the terminal. For example, although LTE networks were initially deployed to support data services rather than voice-based services, LTE networks have evolved to increasingly support VoLTE and other voice-based services. However, uplink coverage in certain networks (e.g., LTE networks) tends to be limited or at least more limited than downlink coverage. Accordingly, one issue that arises is that the uplink coverage from the terminal to the base station (e.g., eNB, gNB) at the network edge tends to be weak (e.g., resulting in a higher PLR or block error rate (BLER)). Accordingly, to make packet-switched voice calls on LTE networks interoperable with existing networks, a single radio voice call continuity (SRVCC) threshold is defined to hand over VoLTE calls to circuit-switched networks to avoid further degradation in the voice service due to increased packet loss. In other scenarios (e.g., handoff from an LTE network to a WLAN, handoff from a 5G NR network to an LTE network), the terminal examines the handover threshold and decides when to handoff, although the principle is generally the same in that the handover threshold is defined to avoid degradation in voice service due to packet loss. In other scenarios, the handover could also be from one radio cell to an adjacent radio cell with similar radio access technologies.

In general, the handover threshold (e.g., the SRVCC threshold) can therefore vary, even from one UE to another, as the effect of packet loss on the voice service may depend on various factors, including the multimedia codec or codec mode that the voice service is using, the packet loss concealment (PLC) algorithms implemented at the receiving UE(s), and the jitter (or de-jitter) buffer management (JBM) implementation in use at the receiving UE(s). For example, one multimedia codec that can be used is the adaptive multi-rate (AMR) audio codec, which uses link adaptation to select from one of eight different bit rates based on link conditions and is generally used in circuit-switched networks. Adaptive multi-rate wideband (AMR-WB) is similar to the AMR codec except that AMR-WB provides improved speech quality due to a wider speech bandwidth compared to the AMR audio codec. Enhanced voice services (EVS), as described in 3GPP Technical Specification (TS) 26.441, offers greater robustness than AMR and AMR-WB and also offers a channel-aware mode that includes partial redundancy based packet loss concealment mechanisms resulting in improved quality/intelligibility relative to EVS non-channel-aware modes or AMR/AMR-WB. As such, the various aspects described herein generally contemplate a hierarchy in which the AMR audio codec is less robust than AMR-WB, which in turn is less robust than the EVS codec, while EVS channel-aware mode may be the most robust relative to AMR, AMR-WB, and EVS. However, those skilled in the art will appreciate that the other possible audio codecs may be included in the hierarchy, possibly also including future-developed audio codecs that offer greater robustness than EVS channel-aware mode. Accordingly, the hierarchy in which EVS channel-aware mode is the most robust and AMR is the least robust is described herein for illustrative purposes only and is not intended to be limiting in any way.

Furthermore, PLC algorithms such as zero insertion, waveform substitutions, model-based methods, and so on generally mask the effects of packet loss in VoIP communications. This is because voice signals are sent over a network in packets that may travel different routes to a destination and consequently arrive late, corrupted, out-of-order, or not at all. Relatedly, because packets may arrive at a decoder out-of-order or with random jitters in arrival time, JBM implementations may use different techniques to absorb the jitter(s) in the packet arrival time so that a speech packet may beefed to the decoder at evenly spaced periodic intervals. Consequently, there are various factors that may influence the packet loss that each UE can tolerate to maintain a quality voice session.

One of the challenges in setting the appropriate handover threshold, which is generally handled at a mobile infrastructure in a WWAN or other wireless network, (e.g., at the eNB in an LTE network or a gNB in an NR network), is therefore to ensure that the end-to-end (e2e) error rate across the transport path from the media sender to receiver does not exceed the maximum packet loss that the codec, PLC, and JBM can handle without resulting in a substantially degraded quality and/or intelligibility. For example, referring to FIG. 3, voice transmissions in a direction from UE 302-2 to UE 302-1 (e.g., any of the UEs described above in FIGS. 1, 2A, 2B) are sent on an uplink 332 from UE 302-2 to a local base station 322-2 (e.g., any of the base stations described above in FIGS. 1, 2A, 2B), which then forwards the transmissions to a local base station 322-1 (e.g., any of the base stations described above in FIGS. 1, 2A, 2B) for the UE 302-1 over a backhaul link 334. The local base station 322-1 then sends the voice transmissions to the receiving UE 302-1 on a downlink 336. Similarly, in the opposite direction, voice transmissions from UE 302-1 to UE 302-2 are sent on an uplink 342 from UE 302-1 to the local base station 322-1, which then forwards the transmissions to the local base station 322-2 for the UE 302-2 over a backhaul link 344. The local base station 322-2 then sends the voice transmissions to the receiving UE 302-2 on a downlink 346. Assuming that there is no packet loss or negligible packet loss on the backhaul links 334, 344, this means that for the voice transmissions sent in the direction from UE 302-2 to UE 302-1, the sum of the PLR on the uplink 332 and the downlink 336 has to be less than or equal to the maximum PLR for the codec in use during the voice session and the PLC algorithm(s) and JBM implementation(s) in use at UE 302-1. Similarly, in the other direction of transmitting voice from UE 302-1 to UE 302-2, the sum of the PLR on the uplink 342 and the downlink 346 has to be less than or equal to the maximum PLR for the codec in use during the voice session and the PLC algorithm(s) and JBM implementation(s) in use at UE 302-2.

Figure 4A:
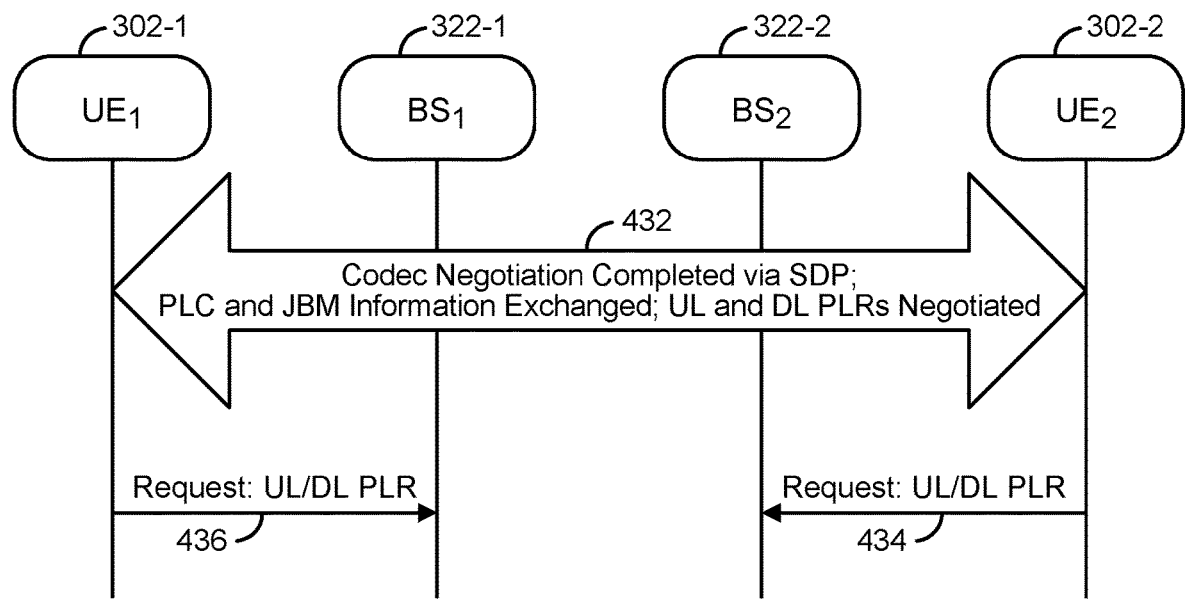
FIGS. 4A-4D illustrate exemplary communication flows that can be used to provide a base station with suitable information to establish an appropriate handover threshold based on tolerable packet loss at a terminal, according to various aspects.
Figure 4B:
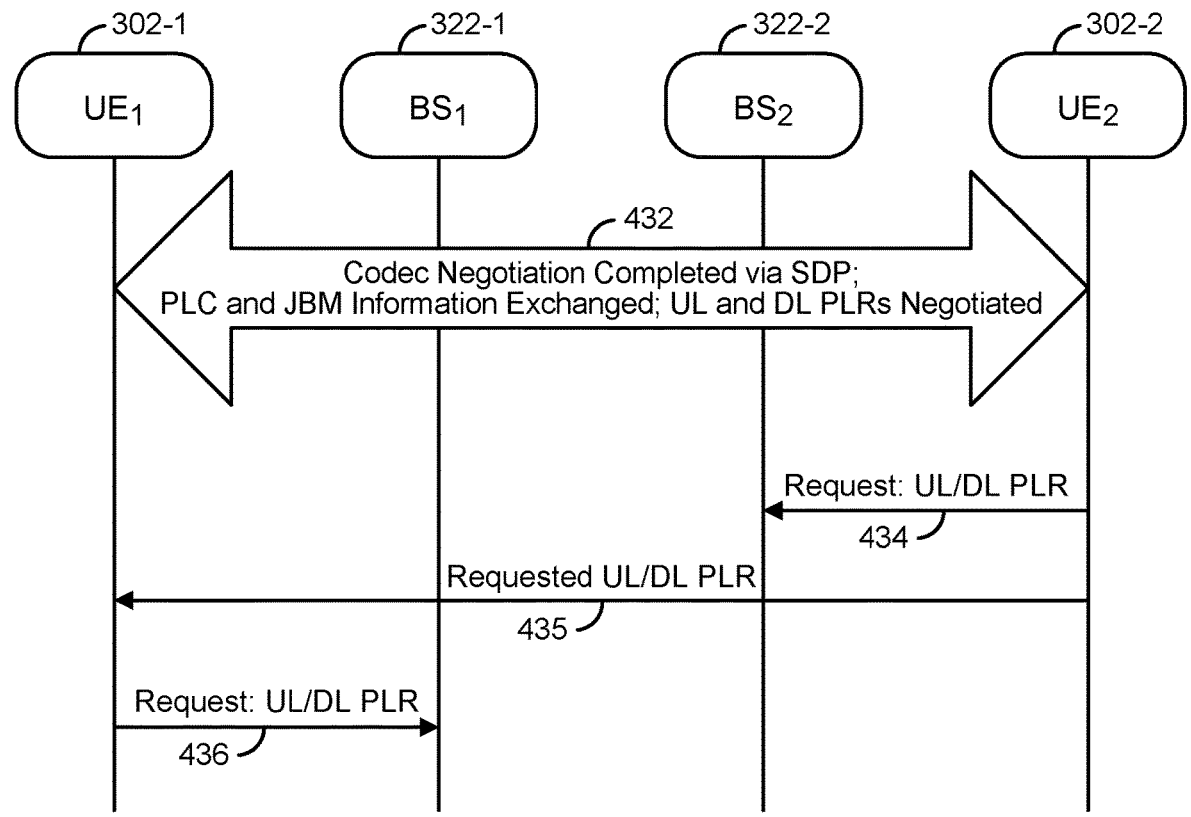
Figure 4C:
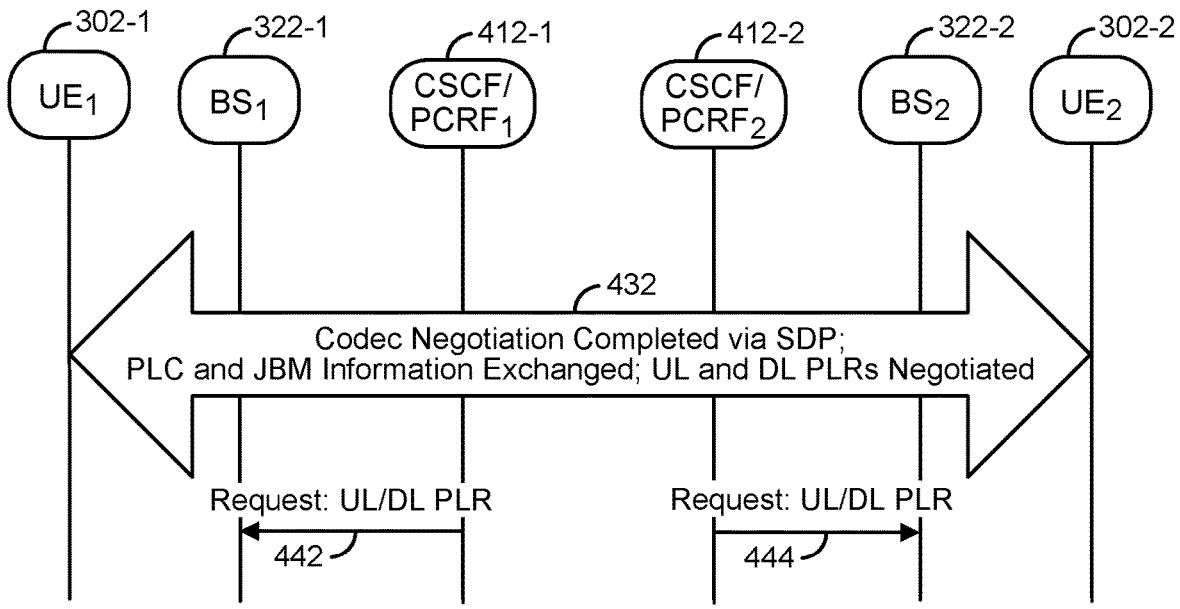

In some scenarios, the multimedia session negotiates the use of multiple codecs or codec modes with different robustness to packet losses. In such scenarios, the UEs 302-1, 302-2 can use any of the negotiated codecs or codec modes at any time and the infrastructure (e.g., base stations 322-1, 322-2) does not explicitly know which codec is in use. Accordingly, FIGS. 4A-4C illustrate exemplary communication flows that can be used to provide a base station (e.g., base stations 322-1, 322-2) with suitable information to establish an appropriate handover threshold based on tolerable packet loss at a terminal (e.g., UEs 302-1, 302-2). Furthermore, because the PLC algorithm(s) and JBM implementation(s) can vary from one terminal to another, the appropriate handover threshold may be UE-specific because two UEs that are using the same multimedia codec may be able to tolerate different PLRs due to differences in the PLC algorithm(s) and/or JBM implementation(s) in use at the respective UEs. However, because the PLC algorithm(s) and JBM implementation(s) and performance are conventionally only known at the terminal receiving media, the PLC algorithm(s) and JBM implementation(s) need to be signaled to the network. Furthermore, because there are typically two radio links in the end-to-end path from the sending terminal to the receiving terminal (e.g., uplink 332 and downlink 336 in the end-to-end path when sending from UE 302-2 to UE 302-1), the information has to be shared with the two base stations 322-1, 322-2 in the transport path to determine how to set the appropriate PLR targets.

Accordingly, FIG. 4A illustrates one possible solution to signal PLR requirements to the two base stations 322-1, 322-2 in the transport path between the UEs 302-1, 302-2 based on the codec in use as well as the PLC and JBM implementations in use. More particularly, at 432, the UEs 302-1, 302-2 may perform a codec negotiation, during which the UEs 302-1, 302-2 exchange information about their PLC and JBM capabilities. For example, the PLC capabilities may include one or more PLC algorithms such as zero insertion, waveform substitutions, model-based methods, while the JBM capabilities may refer to a target underflow rate or other suitable JBM implementation used to counter jitter in a packet-switched network (e.g., the effective packet loss, jitter induced packet/delay loss statistics experienced over time, location, etc.). The PLC and JBM capabilities could take the form of a total tolerable PLR that the respective UEs 302-1, 302-2 can tolerate for a given codec/mode and current PLC and JBM implementation. For example, codec mode can be any operating point of a codec, which may include different bit rates (e.g., as per EVS or AMR-WB codec rates in 3GPP TS 26.441), audio bandwidths (e.g., narrowband, wideband, super-wideband), speech/audio coding types, channel aware or non-channel aware mode, extended PLC post-processing techniques, etc.

Based on this exchange of the required maximum end-to-end (e2e) PLR, the respective UEs 302-1, 302-2 can determine what maximum PLR to request of the respective local base stations 322-1, 322-2. In various aspects, the UEs 302-1, 302-2 can be specified, pre-configured, or dynamically configured (e.g., via open mobile alliance device management (OMA-DM)) to divide the max end-to-end (e2e) PLR across the uplink and downlink according to an agreed-upon ratio. For example, the max e2e PLR could be divided according to a 1:1 ratio, whereby the UEs 302-1, 302-2 may request that the base stations 322-1, 322-2 each provide links to support PLRs that are half of the max e2e PLR. Alternatively, the UEs 302-1, 302-2 can negotiate how to distribute the maximum tolerable end-to-end PLR according to a different ratio. For example, the UEs 302-1, 302-2 may negotiate a ratio that allows for more errors on an uplink than a downlink because LTE networks, for example, may have more limited uplink coverage. As such, referring again to FIG. 3, if the variable R is used to represent the ratio of the uplink PLR to the downlink PLR, then UE 302-1 may request that base station 322-1 support on the uplink 342 from UE 302-1 to base station 322-1 a PLR equal to the maximum e2e PLR that UE 302-2 can tolerate multiplied by $R/(R+1)$, and UE 302-1 may further request that base station 322-1 support on the downlink 336 a PLR equal to the maximum e2e PLR that UE 302-1 can tolerate multiplied by $1/(R+1)$. In a similar respect, UE 302-2 may request that base station 322-2 support on the uplink 332 from UE 302-2 to base station 322-2 a PLR equal to the maximum e2e PLR that UE 302-1 can tolerate multiplied by $R/(R+1)$ and further request that base station 322-2 support on the downlink 346 a PLR equal to the maximum e2e PLR that UE 302-2 can tolerate multiplied by $1/(R+1)$.

According to various aspects, in a further alternative, as will be described in further detail below, the UEs 302-1, 302-2 may engage in a negotiation (e.g., via session description protocol (SDP)) to explicitly negotiate how to distribute the distribute the maximum tolerable end-to-end PLR. For example, assuming that UE 302-1 employs PLC and/or JBM implementations that permit more tolerable packet loss relative to PLC and/or JBM implementations used at UE 302-2, UE 302-1 could request that base station 322-1 provide a link to support a greater PLR relative to a link that UE 302-2 requests from base station 322-2. For example, at 432, UE 302-1 may send an SDP message with the maximum end-to-end PLR that the UE 302-1 can receive for a codec mode and a current PLC/JMB implementation (e.g., six percent). The other UE 302-2 receives the parameter in the SDP message and decides to use of a portion of this end-to-end PLR for the uplink from base station 322-2 (e.g., four percent). The UE 302-2 then responds to UE 302-1 to indicate that UE 302-2 will use 4% or tell UE 302-1 that UE 302-1 has to request the remaining 2% tolerable PLR from local base station 322-1. UE 302-2 also signals the local base station 322-2 to indicate that UE 302-2 only requires 4% PLR on the uplink to base station 322-2. In any case, as depicted at 434, the UE 302-2 signals its respective uplink and downlink PLR requirements to the local base station 322-2, while the UE 302-1 similarly signals uplink and downlink PLR requirements to its local base station 322-1 at 436.

According to various aspects, FIG. 4B illustrates another possible solution to signal PLR requirements to the two local base stations 322-1, 322-2 in the transport path between the UEs 302-1, 302-2 based on the codec in use as well as the PLC and JBM implementations in use at the respective UEs 302-1, 302-2. In the communication flow shown in FIG. 4B, at 432, the UEs 302-1, 302-2 may engage in a codec negotiation in a similar manner as described above with respect to FIG. 4A. However, the communication flow in FIG. 4B differs in the sense that one terminal (i.e., UE 302-2 in the illustrated example) makes the initial decision as to what PLR to request from the local base station 322-2 and signals the initial decision accordingly at 434. Then, at 435, the UE 302-2 sends a message to UE 302-1 to indicate the PLR that UE 302-2 expects to be requested from base station 322-1, and UE 302-1 then requests the indicated PLR from base station 322-1, as depicted at 436.

According to various aspects, FIG. 4C illustrates still another possible solution to signal PLR requirements to the two base stations 322-1, 322-2 in the transport path between the UEs 302-1, 302-2 based on the codec in use as well as the PLC and JBM implementations in use at the respective UEs 302-1, 302-2. More particularly, at 432, the UEs 302-1, 302-2 may perform a codec negotiation, during which the UEs 302-1, 302-2 exchange information about their PLC and JBM capabilities. For example, the PLC capabilities may include one or more PLC algorithms such as zero insertion, waveform substitutions, model-based methods, while the JBM capabilities may refer to a target underflow rate or other suitable JBM implementation used to counter jitter in a packet-switched network (e.g., the effective packet loss, jitter induced packet/delay loss statistics experienced over time, location, etc.). The PLC and JBM capabilities could take the form of a total tolerable PLR that the respective UEs 302-1, 302-2 can tolerate for a given codec/mode and current PLC and JBM implementation.

Based on this exchange of the required maximum end-to-end PLR, one or more network entities can determine what maximum PLR to request of the respective local base stations 322-1, 322-2. For example, as shown in FIG. 4C, the network entity(ies) may comprise a call session control function (CSCF) or policy and charging rules function (PCRF) 412-1 that sends a message 442 to base station 322-1 to signal the uplink and downlink PLR for UE 302-1 as well as a CSCF/PCRF 412-2 that sends a message 444 to base station 322-2 to signal the uplink and downlink PLR for UE 302-2. In various aspects, the CSCF/PCRFs 412-1, 412-2 can decide to request that each of the base stations 322-1, 322-2 provide links to support PLRs that are based on a particular ratio. For example, the ratio may be a 1:1 ratio such that half of the max end-to-end PLR is allocated to the uplink and the other half to the downlink, or the CSCF/PCRFs 412-1, 412-2 can decide on a ratio whereby the maximum tolerable end-to-end PLR allows more errors on an uplink because LTE networks, for example, may have more limited uplink coverage. In such cases where a ratio is used, the variable R may represent the ratio of the uplink PLR to the downlink PLR. As such, the CSCF/PCRF 412-1 may request that base station 322-1 support on the uplink from UE 302-1 a PLR equal to the maximum e2e PLR that UE 302-2 can tolerate multiplied by R/(R+1) and further request that base station 322-1 support on the downlink to UE 302-1 a PLR equal to the maximum e2e PLR that UE 302-1 can tolerate multiplied by 1/(R+1). In a similar respect, CSCF/PCRF 412-2 may request that base station 322-2 support on the uplink from UE 302-2 a PLR equal to the maximum e2e PLR that UE 302-1 can tolerate multiplied by R/(R+1) and further request that base station 322-2 support on the downlink to UE 302-2 a PLR equal to the maximum e2e PLR that UE 302-2 can tolerate multiplied by 1/(R+1).

In various aspects, another approach may be based upon an SDP negotiation between the UEs 302-1, 302-2. For example, UE 302-1 may send an SDP message with the maximum end-to-end PLR that the UE 302-1 can receive for a codec mode and a current PLC/JMB implementation (e.g., six percent). The CSCF/PCRF 412-1 may see the parameter in the SDP message and decides to allocate on the downlink to UE 302-1 a proportion of the maximum end-to-end PLR (e.g., 2% out of the advertised 6%). At 442, the CSCF/PCRF 412-1 therefore tells the local base station 322-1 to support 2% PLR on the downlink to UE 302-1. The CSCF/PCRF 412-1 also modifies the parameter in the SDP offer to indicate that 4% PLR is required and sends this modified SDP offer to the CSCF/PCRF 412-2. The CSCF/PCRF 412-2 then uses the modified PLR value in the SDP offer to set the uplink PLR at base station 322-2 (e.g., directing the base station 322-2 to use 4% PLR on an uplink from UE 302-2). Furthermore, a similar procedure may happen in the reverse direction. In particular, UE 302-2 sends back in an SDP answer the maximum PLR that UE 302-2 can receive and the local CSCF/PCRF 412-2 takes a portion of the PLR budget. The local CSCF/PCRF 412-2 also directs the local base station 322-2 to set this for the downlink to UE 302-2, modifies the maximum PLR value in the SDP answer before relaying the SDP answer onto CSCF/PCRF 412-1, which in turn directs the local base station 322-1 to use the modified maximum PLR value for the uplink from UE 302-1.

According to various aspects, as described above, FIGS. 4A-4C each illustrate a signaling exchange 432 during which UEs 302-1, 302-2 negotiate a codec and/or codec mode and further exchange PLC and JBM information. Accordingly, and with further reference to FIG. 3, the UEs 302-1, 302-2 may use the signaling exchange 432 to negotiate a maximum end-to-end error rate and an error rate for each link, including at least an uplink 342 from UE 302-1 to base station 322-1 and a downlink 346 from base station 322-2 to UE 302-2 in a direction from UE 302-1 to UE 302-2 as well as an uplink 332 from UE 302-2 to base station 322-2 and a downlink 336 from base station 322-1 to UE 302-1 in a direction from UE 302-2 to UE 302-1. In various aspects, the maximum end-to-end error rate and the error rate for each link may comprise PLR values and/or BLER values, which are generally expressed as percentages. As such, although various aspects described herein may refer to PLR values or BLER values, those skilled in the art will appreciate that the various aspects described herein may be suitably practiced using PLR values and/or BLER values. In any case, with reference to FIG. 3 and the signaling exchange 432 in FIGS. 4A-4C, the following description sets forth exemplary mechanisms that the two endpoint UEs 302-1, 302-2 may use to negotiate a maximum end-to-end error rate and an error rate for each of the links 332, 336, 342, 346. In the following description, the maximum end-to-end error rate and the link-specific error rates are described as PLR percentage values for simplicity. However, as noted above, the negotiation mechanisms could instead be implemented using error rates based on BLER percentage values.

According to various aspects, as described herein, the maximum end-to-end PLR and the PLR for each of the links 332, 336, 342, 346 may be pre-configured at the device level (e.g., at manufacture time) and/or configured at the device level via OMA-DM. For example, as noted above, the PLR values may generally depend on device-specific and/or operator-specific parameters related to supported codecs, supported codec modes, PLC algorithms, JBM implementations, and so on. Furthermore, in various aspects, the maximum end-to-end and link-specific PLR values can be dependent on network conditions. For example, the network may be lightly or heavily loaded at any given point in time, which may impact the ability of the network to support a given PLR value. In other examples, the network may include one or more areas in which good coverage can be provided (e.g., a low uplink/downlink PLR) until an edge of cell is reached, or the maximum PLR values may depend on operator policy (e.g., the network may provide less reliable bearers during busy times of day), etc. In various aspects, this non-static information about the supported PLR can be communicated to the CSCF/PCRFs 412-1, 412-2, which may then modify one or more parameters used in an SDP offer/answer exchange between the UEs 302-1, 302-2 to reflect the link-specific PLR limitation(s). In one alternative implementation, the network PLR conditions could be sent to the UEs 302-1, 302-2 prior to the UEs 302-1, 302-2 initiating the SDP offer/answer negotiation (i.e., the network PLR conditions are broadcast across the cell). In various aspects, such as that shown FIG. 4C, one or more network nodes such as the CSCF/PCRFs 412-1, 412-2 may look at the result of the SDP offer/answer negotiation between the endpoint UEs 302-1, 302-2 and make appropriate requests to the respective base stations 322-1, 322-2 via messages 442, 444.

According to various aspects, during the SDP offer/answer negotiation, one of the endpoint UEs 302-1, 302-2 may be an offeror device and the other may be an answerer device. As will be described in further detail herein, certain SDP attributes may be used in the SDP offer/answer negotiation, including a triad for the offeror device that specifies (i) a maximum e2e PLR that the offeror device is setup to receive (max_e2e_PLR_Off), (ii) a proposed uplink PLR in a direction from the offeror device to the answerer device (UL_PLR_Off), and (iii) a proposed downlink PLR in a direction from the answerer device to the offeror device (DL_PLR_Off). In addition, the SDP attributes used in the SDP offer/answer negotiation may include a substantially similar triad for the answerer device, wherein the answerer triad specifies (i) a maximum e2e PLR that the answerer device is setup to receive (max_e2e_PLR_Ans), (ii) a proposed uplink PLR in a direction from the answerer device to the offeror device (UL_PLR_Ans), and (iii) a proposed downlink PLR in a direction from the offeror device to the answerer device (DL_PLR_Ans). As noted above, all PLR values may be expressed as percentages. Furthermore, because the uplink PLR plus the downlink PLR in a given direction generally adds up to the total e2e PLR, the offeror triad and the answerer triad mentioned above are subject to the following constraints:

UL_PLR_Off+DL_PLR_Ans<=max_e2e_PLR_Ans,
and

UL_PLR_Ans+DL_PLR_Off<=max_e2e_PLR_Off.

According to various aspects, based on the above-mentioned SDP attributes, the SDP offer/answer negotiation may proceed as follows. First, the offeror device may send an SDP offer to the answerer device that indicates the offeror triad set, including max_e2e_PLR_Off, UL_PLR_Off, and DL_PLR_Off. The answerer device, upon receiving the SDP offer, may then either accept or modify the proposed UL_PLR_Off and DL_PLR_Off values. For example, if the proposed UL_PLR_Off exceeds the difference between max_e2e_PLR_Ans and DL_PLR_Ans, the proposed UL_PLR_Off may be more than the answerer device can handle. In such cases, the answerer device may reduce the proposed UL_PLR_Off value to fit within the end-to-end PLR limit that the answerer device can handle, taking into consideration any portion thereof that the answerer device may need to reserve for DL_PLR_Ans. When the answerer device receives the SDP offer, the answerer device may have all the information needed to either accept or modify the offer based on the information in the offeror triad and the PLR configuration at the answerer device, specifically the values for max_e2e_PLR_Ans, UL_PLR_Ans, and DL_PLR_Ans. In the event that the answerer device decides to modify the PLR parameters specified in the offeror triad, the offeror device may either accept the modified PLR parameters in the modified offer or reject the modified offer. In various aspects, the answerer device may therefore respond with its triad set. In certain cases, because the uplink PLR and the downlink PLR in a given direction add up to the total end-to-end PLR in that direction, the answerer device may only need to provide the max_e2e_PLR_Ans value, as the other values can be derived from the values in the offeror triad. However, as discussed below, reducing the parameters provided in the SDP answer may not allow for scenarios that do not exhaust the entire PLR budget (e.g., to maintain a higher quality voice call) and/or limit applicability to scenarios in which the uplink PLR and downlink PLR are split equally.

In one implementation, the SDP offer/answer negotiation as described above may be applied in a scenario in which the answerer device has a PLR configuration that indicates agreement with the offeror triad included in the SDP offer from the offeror device and further in which the entire end-to-end PLR budget is utilized. For example, the SDP offer may include an offeror triad in which max_e2e_PLR_Off equals five (5), UL_PLR_Off equals seven (7), and DL_PLR_Off equals one (1). Assuming the answerer device can support these PLR requirements based on supported codecs/codec modes, PLC algorithms, and/or JBM implementations, the answerer device may insert the answerer triad into the SDP answer without modifying the offeror triad. As such, because the entire end-to-end PLR budget is utilized in this example, the SDP answer may include an answerer triad in which max_e2e_PLR_Ans equals nine (9), UL_PLR_Ans equals four (4), and DL_PLR_Ans equals two (2). Accordingly, in a direction from the answerer device to the offeror device, the maximum 5% end-to-end budget for max_e2e_PLR_Off is split up into 1% PLR for the downlink to the offeror device and 4% PLR for the uplink from the answerer device. Similarly, in a direction from the offeror device to the answerer device, the maximum 9% end-to-end budget for max_e2e_PLR_Ans is split up into 2% PLR for the downlink to the answerer device and 7% PLR for the uplink from the offeror device.

In another example implementation, the SDP offer/answer negotiation as described above may be applied in a scenario in which the answerer device has a PLR configuration that agrees with the offeror triad included in the SDP offer from the offeror device, except that this scenario may differ from the previous scenario in that the entire end-to-end PLR budget is not utilized. As will be apparent to those skilled in the art, voice quality may generally degrade as PLR/BLER increases, whereby utilizing less than the entire end-to-end PLR budget may leader to a better quality voice session. For example, the SDP offer may include an offeror triad in which the value for max_e2e_PLR_Off is ten (10), the value for UL_PLR_Off is five (5), and the value for DL_PLR_Off is one (1). Assuming the answerer device can support these PLR requirements based on supported codecs/codec modes, PLC algorithms, and/or JBM implementations, the answerer device may insert the answerer triad into the SDP answer without modifying the offeror triad. However, because the entire end-to-end PLR budget is not utilized in this example, the SDP answer may include an answerer triad in which the values are configured to not utilize the entire max_e2e_PLR_Off and/or max_e2e_PLR_Ans end-to-end budgets. For example, in one possible answerer triad that may achieve this objective, the value for max_e2e_PLR_Ans may be set to nine (9), the value for UL_PLR_Ans may be set to four (4), and the value for DL_PLR_Ans may be set to two (2). Accordingly, in a direction from the answerer device to the offeror device, the maximum 10% end-to-end budget for max_e2e_PLR_Off is split up into 1% PLR for the downlink to the offeror and 4% PLR for the uplink from the answerer, leaving 5% of the end-to-end budget unutilized. Similarly, in a direction from the offeror device to the answerer device, the maximum 9% end-to-end budget for max_e2e_PLR_Ans is split up into 2% PLR for the downlink to the answerer and 5% PLR for the uplink from the offeror, leaving 2% of the end-to-end budget unutilized.

In still another example implementation, the SDP offer/answer negotiation as described above may be applied in a scenario in which the answerer device has a PLR configuration that conflicts with the offeror triad included in the SDP offer from the offeror device, wherein the entire end-to-end PLR budget may need to be utilized in order to fit the link-specific PLR values within the maximum end-to-end PLR values in either or both directions. For example, this scenario may be illustrated in an SDP offer that includes an offeror triad in which the value for max_e2e_PLR_Off is ten (10), the value for UL_PLR_Off is seven (7), and the value for DL_PLR_Off is one (1). Assuming that the answerer device has a PLR configuration in which max_e2e_PLR_Ans is seven (7), UL_PLR_Ans is four (4), and DL_PLR_Ans is two (2), the proposed value for UL_PLR_Off exceeds the limit defined by the difference between max_e2e_PLR_Ans and DL_PLR_Ans. As such, the answerer device may modify the SDP offer to reduce the value for UL_PLR_Off from seven (7) to five (5) such that UL_PLR_Off+DL_PLR_Ans=max_e2e_PLR_Ans. In such a case, the SDP answer may include SDP attributes in which max_e2e_PLR_Ans is seven (7), UL_PLR_Ans is four (4) DL_PLR_Ans is two (2), and further in which the offeror triad is modified such that max_e2e_PLR_Off remains at ten (10), UL_PLR_Off is reduced to five (5), and DL_PLR_Off remains at one (1). Upon receiving the SDP answer, the offeror device can either accept or reject the payload type.

According to various aspects, as mentioned briefly above, there may be certain cases in which the number of SDP attributes used in the SDP offer/answer can be reduced from the three used in the offeror/answerer triads described above. For example, in various aspects, the uplink PLR and the downlink PLR in a given direction can generally be assumed to add up to the total end-to-end PLR in that direction. As such, the offeror/answerer PLR configurations could be simplified to two parameters, namely the end-to-end PLR and the link-specific PLR in either the uplink or the downlink direction, as the PLR in the other direction can be derived from the other values. However, this approach does not allow for scenarios in which the entire end-to-end PLR budget is not utilized (e.g., to maintain better voice quality). Furthermore, another possible simplification may be to only communicate one parameter, namely the maximum end-to-end PLR budget, which may be well-suited to implementations in which the maximum end-to-end PLR budget is equally split among the uplink PLR and the downlink PLR.

According to various aspects, with specific reference to FIG. 4C, the above-described principles may be applied in a scenario where the CSCF/PCRFs 412-1, 412-2 send the required maximum uplink PLR and downlink PLR values to the base stations 322-1, 322-2 using messages 442, 444. For example, in an SDP-negotiated approach, the UEs 302-1, 302-2 may negotiate the proportion of the maximum end-to-end (e2e) PLR to allocate to the uplink and downlink associated with their local base stations 322-1, 322-2 in a substantially similar manner as described above. However, rather than having the UEs 302-1, 302-2 request the resulting uplink and downlink PLRs directly from the base stations 322-1, 322-2, the CSCF/PCRFs 412-1, 412-2 may examine the SDP answer to extract the negotiated PLR configuration and communicate the appropriate values to the respective local base stations 322-1, 322-2. For example, if UE 302-1 is the offerer device and UE 302-2 is the answerer device, then CSCF/PCRF 412-1 may ask base station 322-1 to support UL_PLR_Off on its uplink from UE 302-1 and further ask base station 322-1 to support on DL_PLR_Off on its downlink to UE 302-1 based on the appropriate values indicated in the SDP answer from UE 302-2. Furthermore, CSCF/PCRF 412-2 may ask base station 322-2 to support UL_PLR_Ans on its uplink from UE 302-2 and further ask base station 322-2 to support DL_PLR_Ans on its downlink to UE 302-2.

According to various aspects, a PCRF-negotiated approach may also be implemented, which may advantageously leverage the fact that the CSCF/PCRFs 412-1, 412-2 may have more dynamic information about the loading and coverage situation of the base stations 322-1, 322-2 serving the UEs 302-1, 302-2. As such, in the PCRF-negotiated approach, the CSCF/PCRFs 412-1, 412-2 negotiate the proportion of the maximum e2e_PLR to allocate to the uplinks and downlinks associated with base stations 322-1, 322-2 as follows. First, in an SDP offer to the answerer UE 302-2, the offeror UE 302-1 may indicate its maximum end-to-end PLR (max_e2e_PLR_Off). The CSCF/PCRF 412-1 may see this parameter value decide how to allocate a proportion of max_e2e_PLR_Off to the downlink of base station 322-1 based on operator policy, which may be indicated by adding DL_PLR_Off in the SDP offer. The CSCF/PCRF 412-1 may also indicate a preferred uplink PLR by adding UL_PLR_Off into the SDP offer. The CSCF/PCRF 412-2 may store the values of DL_PLR_Off and UL_PLR_Off in the SDP offer and remove these SDP parameters from the SDP offer before forwarding this onto the answerer UE 302-2. The answerer UE 302-2 receives the SDP offer, and responds by including its maximum end-to-end PLR, max_e2e_PLR_Ans in the SDP answer it sends back. The CSCF/PCRF 412-2 receives the SDP answer and checks that DL_PLR_Ans plus UL_PLR_Off is less than max_e2e_PLR_Ans. If this condition is met, then CSCF/PCRF 412-2 adds DL_PLR_Ans and UL_PLR_Off into the SDP answer. Otherwise, the CSCF/PCRF 412-2 modifies both DL_PLR_Ans and UL_PLR_Off so that their sum is less than max_e2e_PLR_Ans and then includes them into the SDP answer. In a similar respect, the CSCF/PCRF 412-2 may check that UL_PLR_Ans plus DL_PLR_Off is less than max_e2e_PLR_Off. If this condition is met, then the CSCF/PCRF 412-1 may add UL_PLR_Ans and DL_PLR_Off into the SDP answer. Otherwise, the CSCF/PCRF 412-2 modifies both UL_PLR_Ans and DL_PLR_Off so that their sum is less than max_e2e_PLR_Off and then includes them into the SDP answer. When the CSCF/PCRF 412-1 receives the SDP answer, the SDP answer may be rejected if the values of UL_PLR_Off and DL_PLR_Off that were modified by the CSCF/PCRF 412-2 are not acceptable. If the CSCF/PCRF 412-1 accepts the SDP answer, then both CSCF/PCRFs 4121, 412-2 have all the information needed to communicate the required UL and DL PLRs to their local base stations 322-1, 322-2.

According to various aspects, in some aspects, the PCRF-negotiated approach may be implemented using a single SDP parameter, namely, the maximum end-to-end PLR, or max_e2e_PLR. In the description below the "_Off" and "_Ans" extensions are added for clarity to aid in understanding what is being described, as only the max_e2e_PLR parameter may be used in the actual SDP parameter. In the PCRF-negotiated approach using the single SDP parameter, the offeror UE 302-1 sends max_e2e_PLR_Off in the SDP offer. The CSCF/PCRF 412-1 may see this parameter in the SDP offer and decide that it will allocate on the downlink to UE 302-1 DL_PLR_Off which is less than max_e2e_PLR_Off. The CSCF/PCRF 412-1 also modifies the max_e2e_PLR_Off parameter in the SDP offer to indicate a new max_e2e_PLR_Off=old max_e2e_PLR_Off−DL_PLR_Off. This modified SDP offer is sent to the CSCF/PCRF 412-2, which uses the modified max_e2e_PLR_Off value in the SDP offer to set the uplink PLR at base station 322-2 to UL_PLR_Ans=new max_e2e_PLR_Off. The CSCF/PCRF 412-2 could also choose to use a UL_PLR_Ans that is less than new max_e2e_PLR_Off if it did not want to use the entire e2e_PLR budget. In the reverse direction a similar procedure happens, wherein the answerer UE 302-2 sends its max_e2e_PLR_Ans in the SDP answer. The local CSCF/PCRF 412-2 takes a portion of max_e2e_PLR_Ans and allocates it to the downlink of base station 322-2 in DL_PLR_Ans. The CSCF/PCRF 412-2 also modifies the max_e2e_PLR_Ans in the SDP answer to indicate a new max_e2e_PLR_Ans=old max_e2e_PLR_Ans−DL_PLR_Ans. The CSCF/PCRF 412-2 then sends this modified max_e2e_PLR_Ans value to the CSCF/PCRF 412-1, which uses the modified max_e2e_PLR_Ans value in the SDP answer to set the uplink PLR at base station 322-1 such that UL_PLR_Off=new max_e2e_PLR_Ans. The CSCF/PCRF 412-1 could also choose to use a value for UL_PLR_Off that is less than new max_e2e_PLR_Ans if it did not want to use the entire e2e_PLR budget.

The present disclosure also provides additional techniques for packet loss concealment and de-jitter buffer management. In general, in addition to the negotiated codecs and codec modes, the end-to-end quality and robustness to packet loss of a service can depend on the multimedia telephony service for IP multimedia subsystem (IMS) (MTSI) client implementation of functions such as PLC and JBM. A set of end-to-end and link-by-link PLR parameters is specified to provide the following:

Enable MTSI clients to indicate for each RTP payload type the effective PLR resulting from the codec, codec mode, packet loss concealment, de jitter buffer management and other implementation considerations.

Enable MTSI clients to negotiate how the end-to-end PLR budget is distributed across the different radio links in a media transport path.

Indicate to the PCRFs what PLR values can be used on the local uplink and downlink to the MTSI clients.

For each payload type, two triads of SDP attributes are defined.

As a first technique, referring to the offering MTSI client, for each RTP payload type, an offering MTSI client should include the following SDP attributes in its SDP offer:

Name: maxe2ePLROff(maximum end-to-end PLR of the offering MTSI client)
Value: maxe2ePLROff-value
Usage Level: media
Charset Dependent: no
Syntax:
  maxe2ePLROff-value=payload-type SP plr-value
  payload-type=zero-based-integer
  plr-value=integer This attribute indicates in the e the maximum end-to-end packet loss rate that can be properly received by the media codec in the offering MTSI client (including effects of codec mode, packet loss concealment, de-jitter buffering, etc. . . . ) indicated by the RTP payload type number payload-type (as used in an "e" line). The plr-value represents percent of packet loss as an integer.

Name: ULPLROff(Uplink PLR of the offering MTSI client)
Value: ULPLROff-value
Usage Level: media
Charset Dependent: no
Syntax:
  ULPLROff-value=payload-type SP plr-value
  payload-type=zero-based-integer
  plr-value=integer This attribute indicates in the plr-value the maximum packet loss rate that the offering MTSI client is offering to allow on its local uplink for the media codec indicated by the RTP payload type number payload-type. The plr-value represents percent of packet loss as an integer.

Name: DLPLROff(Downlink PLR of the offering MTSI client)
Value: DLPLROff-value
Usage Level: media
Charset Dependent: no
Syntax:
  DLPLROff-value=payload-type SP plr-value
  payload-type=zero-based-integer
  plr-value=integer This attribute indicates in the plr-value the maximum packet loss rate that the offering MTSI client is offering to allow on its local downlink for the media codec indicated by the RTP payload type number payload-type. The plr-value represents percent of packet loss as an integer.

When the offering MTSI client includes the above attributes in the SDP offer, it should ensure that for each RTP payload format, DLPLROff should not exceed maxe2ePLROff.

If the maxe2ePLRAns attribute is not present or invalid, then the offering MTSI client, or any other intermediate node processing the PLR information (e.g., CSCF/PCRF), should use the nominal PLR value for the codec and mode as the value of maxe2ePLRAns. Alternatively, the maxe2ePLRAns is taken to be 2%.

If the ULPLRAns attribute is not included in the corresponding SDP answer then the offering MTSI client, or any other intermediate node processing the PLR information (e.g., CSCF/PCRF), should use half the nominal PLR value for the codec and mode as the value of ULPLRAns. Alternatively, the ULPLRAns is taken to be 1%.

If the DLPLRAns attribute is not included in the corresponding SDP answer then the offering MTSI client, or any other intermediate node processing the PLR information (e.g., CSCF/PCRF), should use half the nominal PLR value for the codec and mode for the value of DLPLAns. Alternatively, the DLPLRAns is taken to be 1%.

Referring now to the answering MTSI client, for each RTP payload type, an answering MTSI client should include the following SDP attributes in its SDP answer:

Name: maxe2ePLRAns(maximum end-to-end PLR of the answering MTSI client)
Value: maxe2ePLRAns-value
Usage Level: media
Charset Dependent: no
Syntax:
  maxe2ePLRAns-value=payload-type SP plr-value
  payload-type=zero-based-integer
  plr-value=integer This attribute indicates in the plr-value the maximum end-to-end packet loss rate that can be properly received by the media codec in the answering MTSI client (including effects of codec mode, packet loss concealment, de jitter buffering, etc. . . . ) indicated by the RTP payload type number payload-type (as used in an "m=" line). The plr-value represents percent of packet loss as an integer.

Name: ULPLRAns(Uplink PLR of the answering MTSI client)
Value: ULPLRAns-value
Usage Level: media
Charset Dependent: no
Syntax:
  ULPLRAns-value=payload-type SP plr-value
  payload-type=zero-based-integer
  plr-value=integer This attribute indicates in the plr-value the packet loss rate that the answering MTSI client can allow on its local uplink for the media codec indicated by the RTP payload type number payload-type. The plr-value represents percent of packet loss as an integer. The answering MTSI client should consider setting ULPLRAns to a value below maxe2ePLROff–DLPLROff to avoid the end-to-end PLR for media transmitted to the offering client exceed maxe2ePLROff.

Name: DLPLRAns (downlink PLR of the answering MTSI client)
Value: DLPLRAns-value
Usage Level: media
Charset Dependent: no
Syntax:
  DLPLRAns-value=payload-type SP plr-value
  payload-type=zero-based-integer
  plr-value=integer This attribute indicates in the plr-value the packet loss rate that the answering MTSI client can allow on its local downlink for the media codec indicated by the RTP payload type number payload-type. The plr-value represents percent of packet loss as an integer.

If the maxe2ePLROff attribute is not included in the SDP offer then the answering MTSI client, or any other intermediate node processing the PLR information (e.g., CSCF/PCRF), should use the nominal PLR value for the codec and mode as the value of maxe2ePLROff. Alternatively, the maxe2ePLROff is taken to be 2%.

If the ULPLROff attribute is not included in the SDP offer then the answering MTSI client, or any other intermediate node processing the PLR information (e.g., CSCF/PCRF), should use half the nominal PLR value for the codec and mode as the value of ULPLROff. Alternatively, the ULPLROff is taken to be 1%.

If the DLPLROff attribute is not included in the SDP offer then the answering MTSI client, or any other intermediate node processing the PLR information (e.g., CSCF/PCRF), should use half the nominal PLR value for the codec and mode as the value of DLPLROff. Alternatively, the DLPLROff is taken to be 1%.

When the answering MTSI client includes the above attributes in the SDP answer it should ensure that for each RTP payload format DLPLRAns should not exceed maxe2ePLRAns and ULPLRAns should not exceed maxe2ePLROff.

Furthermore, the answering MTSI client should follow the proposed distribution of the far-end uplink and downlink PLRs by the offering MTSI client. The answering MTSI can perform the following:

If ULPLROff is less than half the nominal PLR value for the codec and mode, the sum of DLPLRAns and ULPLROff should not exceed maxe2ePLRAns. Otherwise (if ULPLROff is no less than half the nominal PLR value for the codec and mode), the sum of DLPLRAns and ULPLROff should not exceed maxe2ePLRAns.

If DLPLROff is less than half the nominal PLR value for the codec and mode, the sum of ULPLRAns and DLPLROff should not exceed maxe2ePLROff. Otherwise (if DLPLROff is no less than half the nominal PLR value for the codec and mode), the sum of ULPLRAns and DLPLROff should not exceed maxe2ePLROff.

As a second technique, referring to the offering MTSI client, for each RTP payload type, an offering MTSI client should include the following SDP attribute in its SDP offer:

Name: maxe2ePLROff(maximum end-to-end PLR of the offering MTSI client)
Value: maxe2ePLROff-value
Usage Level: media
Charset Dependent: no
Syntax:
  maxe2ePLROff-value=payload-type SP maxe2e-plr ":" [maxDL-PLR] "/" [maxUL-PLR]
  payload-type=zero-based-integer
  maxe2e-PLR=plr-value
  maxDL-PLR=plr-value
  maxUL-PLR=plr-value
  plr-value=integer The maxe2e-plr represents the maximum end-to-end packet loss rate that can be properly received by the media decoder in the offering MTSI client (including effects of codec mode, packet loss concealment, de-jitter buffering, etc. . . . ) indicated by the RTP payload type number payload-type (as used in an "m=" line).

The maxDL-PLR indicates the maximum packet loss rate that the offering MTSI client is able to handle on its local downlink and should not exceed the maxe2e-plr value in the SDP offer. If the parameter is not included then the default value is taken to be half of the maxe2e-plr value included in the SDP offer.

The maxUL-PLR indicates the maximum packet loss rate that the offering MTSI client is able to handle on its local uplink. If the parameter is not included then the default value is taken to be half of the maxe2e-plr value the answering MTSI client will include in its corresponding SDP answer.

The plr-value represents percent of packet loss as an integer.

Referring now to the answering MTSI client, for each RTP payload type, an answering MTSI client should include the following SDP attribute in its SDP answer:

Name: maxe2ePLRAns(maximum end-to-end PLR of the answering MTSI client)
Value: maxe2ePLRAns-value
Usage Level: media
Charset Dependent: no
Syntax:
  maxe2ePLRAns-value=payload-type SP maxe2e-plr ":" [maxDL-PLR] "/" [maxUL-PLR]
  payload-type=zero-based-integer
  maxe2e-PLR=plr-value
  maxDL-PLR=plr-value
  maxUL-PLR=plr-value
  plr-value=integer The maxe2e-plr represents the maximum end-to-end packet loss rate that can be properly received by the media decoder in the answering MTSI client (including effects of codec mode, packet loss concealment, de jitter buffering, etc. . . . ) indicated by the RTP payload type number payload-type (as used in an "m=" line).

The maxDL-PLR indicates the maximum packet loss rate that the answering MTSI client is able to handle on its local downlink and should not exceed the maxe2e-plr value in the SDP answer. If the maxUL-PLR value included in the SDP offer is less than half the maxe2e-plr value included by the answering MTSI client in the SDP answer, then maxDL-PLR in the SDP answer should be set to no greater than maxe2e-plr value included in the SDP answer minus maxUL-PLR value included in the SDP offer. Otherwise (the maxUL-PLR value included in the SDP offer should be no greater than half the maxe2e-plr value included by the answering MTSI client in the SDP answer), then maxDL-PLR in the SDP answer should be set to no greater than the maxe2e-plr value included in the SDP answer minus maxUL-PLR value included in the SDP offer. If the maxDL-PLR parameter is not included, then the default value is taken to be the lesser of half of the maxe2e-plr value included in the SDP answer or the maxe2e-plr value included in the SDP answer minus maxUL-PLR value included in the SDP offer.

The maxUL-PLR indicates the maximum packet loss rate that the answering MTSI client is able to handle on its local uplink and should not exceed the maxe2e-plr value in the SDP offer. If the maxDL-PLR value included in the SDP offer is less than half the maxe2e-plr value included by the offering MTSI client in the SDP offer, then maxUL-PLR in the SDP answer should be set to no greater than maxe2e-plr value included in the SDP offer minus maxDL-PLR value included in the SDP offer. Otherwise (if the maxDL-PLR value included in the SDP offer is greater than half the maxe2e-plr value included by the offering MTSI client in the SDP offer), then maxUL-PLR in the SDP answer should be set to no greater than maxe2e-plr value included in the SDP offer minus maxDL-PLR value included in the SDP offer. If the maxUL-PLR parameter is not included then the default value is taken to be the lesser of half of the maxe2e-plr value included in the SDP offer or maxe2e-plr value included in the SDP offer minus maxUL-PLR value included in the SDP offer.

The plr-value represents percent of packet loss as an integer.

Figure 4D:
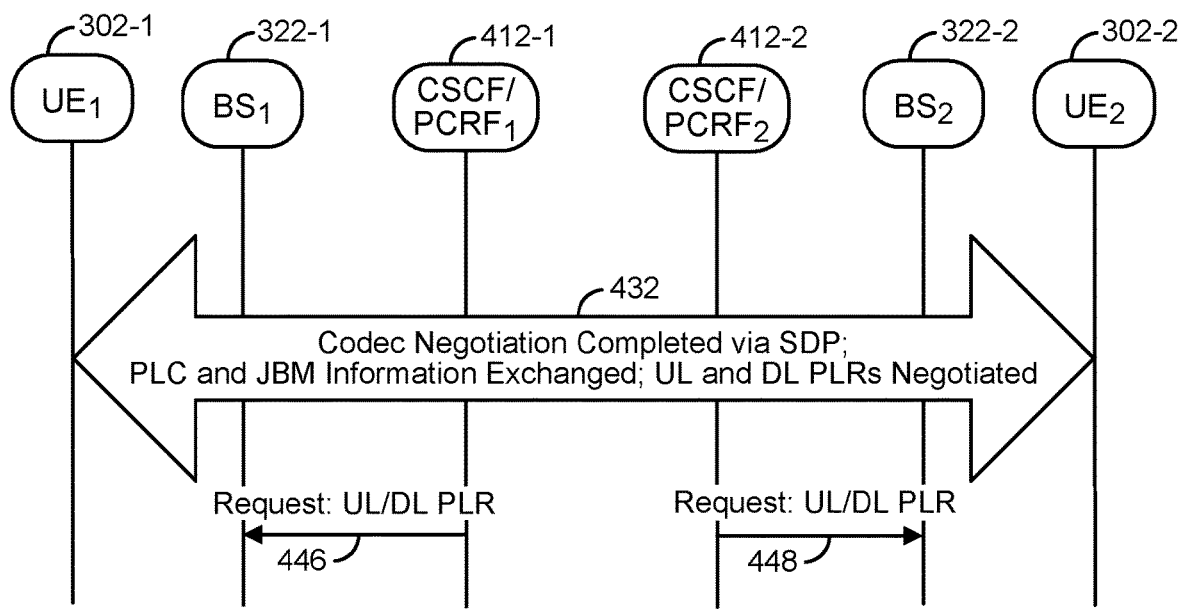

The present disclosure provides additional techniques for packet loss concealment and de jitter buffer management. According to various aspects, FIG. 4D illustrates another possible solution to signal PLR requirements to the two base stations 322-1, 322-2 in the transport path between the UEs 302-1, 302-2 based on the codec in use as well as the PLC and JBM implementations in use at the respective UEs 302-1, 302-2. More particularly, at 432, the UEs 302-1, 302-2 may perform a codec negotiation, during which the UEs 302-1, 302-2 exchange information about their PLC and JBM capabilities. For example, as in FIG. 4C, the PLC capabilities may include one or more PLC algorithms such as zero insertion, waveform substitutions, model-based methods, while the JBM capabilities may refer to a target underflow rate or other suitable JBM implementation used to counter jitter in a packet-switched network (e.g., the effective packet loss, jitter induced packet/delay loss statistics experienced over time, location, etc.). The PLC and JBM capabilities could take the form of a total tolerable PLR that the respective UEs 302-1, 302-2 can tolerate for a given codec/mode and current PLC and JBM implementation.

Based on this exchange of the required maximum end-to-end PLR, one or more network entities can determine what maximum PLR to request of the respective local base stations 322-1, 322-2. For example, as shown in FIG. 4D, the network entity(ies) may comprise a CSCF or PCRF 412-1 that sends a message 446 to base station 322-1 to signal the uplink and downlink PLR for UE 302-1 as well as a CSCF/PCRF 412-2 that sends a message 448 to base station 322-2 to signal the uplink and downlink PLR for UE 302-2.

In various aspects, another approach may be based upon an SDP negotiation between the UEs 302-1, 302-2 at 432. In addition to the negotiated codecs and codec modes, the end-to-end quality and robustness to packet loss of a service can depend on the MTSI client implementation of functions such as PLC and JBM. A set of end-to-end and link-by-link PLR parameters may be specified to provide the following:

Enable MTSI clients to indicate for each RTP payload type the effective PLR resulting from the codec, codec mode, packet loss concealment, de jitter buffer management and other implementation considerations.

Enable MTSI clients to negotiate how the end-to-end PLR budget is distributed across the different radio links in a media transport path.

Indicate to the PCRFs/PCFs (pollicy control functions) what PLR values can be used on the local uplink and donwlink to the MTSI clients.

For each payload type, a triad of SDP attributes may be defined. Referring to the offering MTSI client, for each RTP payload type in a media line that includes the PLR_adapt attribute, an offering MTSI client may include the following SDP attribute in its SDP offer at 432:

Name: maxe2ePLR(maximum end-to-end PLR of media decoder in the MTSI client)
Value: maxe2ePLR-value
Usage Level: media
Charset Dependent: no
Syntax:
  maxe2ePLR-value=payload-type SP maxe2e-plr ":" [maxDL-PLR] "/" [maxUL-PLR]
  payload-type=zero-based-integer
  maxe2e-PLR=plr-value
  maxDL-PLR=plr-value
  maxUL-PLR=plr-value
  plr-value=integer The maxe2e-plr represents the maximum end-to-end packet loss rate that can be properly received by the media decoder in the offering MTSI client (including effects of codec mode, packet loss concealment, de-jitter buffering, etc. . . . ) indicated by the RTP payload type number payload-type (as used in an "m=" line).

The maxDL-PLR parameter indicates the maximum packet loss rate that the offering MTSI client is able to handle on its local downlink and should not exceed the maxe2e-plr value in the SDP offer. If the parameter is not included, then the default value from the offering MTSI client is set to half of the maxe2e-plr value included in the SDP offer.

The maxUL-PLR parameter indicates the maximum packet loss rate that the offering MTSI client is able to handle on its local uplink. If the parameter is not included then the default value from the offering MTSI client is set to half of the maxe2e-plr value the answering MTSI client will include in its corresponding SDP answer.

The plr-value represents percent of packet loss as an integer.

Referring to the answering MTSI client, for each RTP payload type in a media line that includes the PLR_adapt attribute, an answering MTSI client may include the following SDP attribute in its SDP answer at 432:

Name: maxe2ePLR(maximum end-to-end PLR of media decoder in the MTSI client)
Value: maxe2ePLR-value
Usage Level: media
Charset Dependent: no
Syntax:
    maxe2ePLR-value=payload-type SP maxe2e-plr ":" [maxDL-PLR] "/" [maxUL-PLR]
    payload-type=zero-based-integer
    maxe2e-PLR=plr-value
    maxDL-PLR=plr-value
    maxUL-PLR=plr-value
    plr-value=integer The maxe2e-plr represents the maximum end-to-end packet loss rate that can be properly received by the media decoder in the answering MTSI client (including effects of codec mode, packet loss concealment, de jitter buffering, etc. . . . ) indicated by the RTP payload type number payload-type (as used in an "m=" line).

If maxe2e-plr is not included in the SDP offer, then its value is set to a nominal value for the codec and mode.

The maxDL-PLR parameter included in the SDP answer indicates the maximum packet loss rate that the answering MTSI client is able to handle on its local downlink and should not exceed the maxe2e-plr value in the SDP answer.

If the maxUL-PLR value included in the SDP offer is less than half the maxe2e-plr value included by the answering MTSI client in the SDP answer (meaning that the offerer is being generous, so the answerer has no reason to exceed the e2e limit while meeting the request of the offerer), then maxDL-PLR in the SDP answer should be set to no greater than the maxe2e-plr value included in the SDP answer minus the maxUL-PLR value included in the SDP offer. Otherwise, if the maxUL-PLR value included in the SDP offer is no less than half the maxe2e-plr value included in the SDP answer (meaning the offerer is being greedy, so the answerer has the option to not meet the request of the offerer and to indicate a maxDL-PLR value that will require the offerer to handle more PLR on its UL), then the maxDL-PLR in the SDP answer should be set to no greater than the maxe2e-plr value included in the SDP answer minus the maxUL-PLR value included in the SDP offer.

If the maxDL-PLR parameter is not included in the SDP answer then the default value from the answering MTSI client is set to half of the maxe2e-plr value included in the SDP answer.

The maxUL-PLR parameter included in the SDP answer indicates the maximum packet loss rate that the answering MTSI client is able to handle on its local uplink and should not exceed the maxe2e-plr value in the SDP offer.

If the maxDL-PLR value included in the SDP offer is less than half the maxe2e-plr value included by the offering MTSI client in the SDP offer (meaning the offerer is being generous, so the answerer has no reason to exceed the e2e limit while meeting the request of the offerer), then maxUL-PLR in the SDP answer should be set to no greater than the maxe2e-plr value included in the SDP offer minus the maxDL-PLR value included in the SDP offer. Otherwise, if the maxDL-PLR value included in the SDP offer is no less than half the maxe2e-plr value included in the SDP offer (meaning the offerer is being greedy, so the answerer has the option to not meet the request of the offerer and to indicate a maxUL-PLR value that will require the offerer to handle more PLR on its DL), the maxUL-PLR in the SDP answer should be set to no greater than the maxe2e-plr value included in the SDP offer minus the maxDL-PLR value included in the SDP offer.

If the maxUL-PLR parameter is not included then the default value from the answering MTSI client is set to half of the maxe2e-plr value included in the SDP offer.

The plr-value represents percent of packet loss as an integer.

Referring to communicating Max-E2E-PLR of the offerer, the PCF/PCRF is not required to use the information in the SDP offer to determine how to configure the radio network for the service (e.g., QoS). To support networks where the PCF/PCRF does not use the SDP offer information, the following attributes should be included by the answering MTSI client in the SDP answer:

Name: maxe2ePLROff(maximum end-to-end PLR of media decoder in the offering MTSI client)
Value: maxe2ePLROff-value
Usage Level: media
Charset Dependent: no
Syntax:
    maxe2ePLROff-value=payload-type SP maxe2e-plrOff
    payload-type=zero-based-integer
    maxe2e-plrOff=plr-value
    plr-value=integer The maxe2e-plrOff represents the maximum end-to-end packet loss rate that can be properly received by the media decoder in the offering MTSI client indicated by the RTP payload type number payload-type (as used in an "m=" line).

The plr-value represents percent of packet loss as an integer.

If maxe2ePLR is included in the SDP offer, the answering MTSI client should set maxe2ePLROff to the value of maxe2ePLR included in the SDP offer and include the maxe2ePLROff attribute into the SDP answer.

If maxe2ePLR is not included in the SDP offer, the answering MTSI client should not include maxe2ePLROff in the SDP answer.

If maxe2ePLROff is not included in the SDP answer, then its value is set to a nominal value for the codec and mode.

According to various aspects, an exemplary communication flow that can be used to ensure that terminals engaged in a voice session will use more robust multimedia codecs or codec modes upon reaching a coverage edge will now be described with reference to FIG. 5. In particular, according to various aspects, each UE engaged in a voice session may determine actual packet loss rates during the voice session. When the far-end UE receiving media packets detects an increase in packet loss due to poor network coverage, the far-end UE receiving the media packets may send a request (e.g., using codec mode request (CMR)) to the UE transmitting the media packets to use a more robust codec or codec mode (e.g., move from AMR or AMR-WB to EVS, from EVS to EVS channel-aware, etc.). In other examples, when the UE receiving the media packets detects the increased packet loss due to poor network coverage, the receiving UE may send a request to the transmitting UE to use application layer redundancy and/or payload or partial redundancy depending on the negotiated bitrate. In another possible solution, the transmitting UE may detect poor network coverage (e.g., due to low transmission power headroom, build-up in an uplink transmission buffer, etc.). In such cases, the transmitting UE may autonomously start to transmit using a more robust codec or a more robust mode of a codec.

Figure 5:
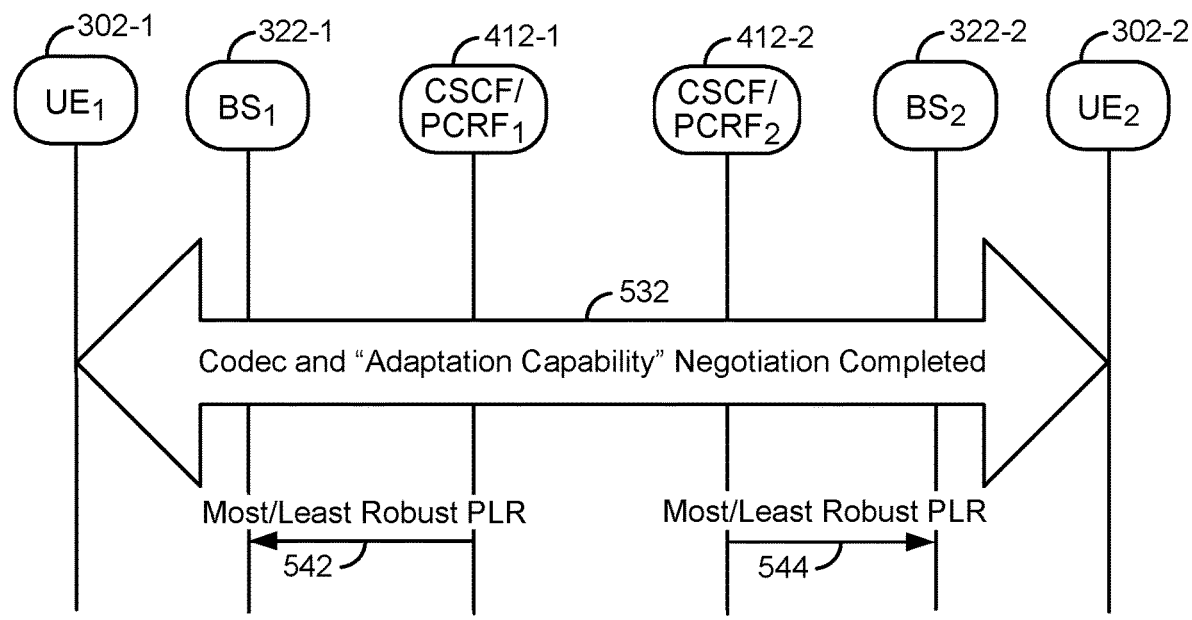
FIG. 5 illustrates an exemplary communication flow that can be used to ensure that terminals engaged in a voice session will use more robust multimedia codecs or codec modes upon reaching a coverage edge, according to various aspects.

Referring to FIG. 5, the communication flow shown in FIG. 5 may be based on an SDP parameter that indicates that both UEs 302-1, 302-2 will perform codec adaptation, which may be exchanged between the UEs 302-1, 302-2 as part of the initial codec negotiation performed at 532. When the core network entities (e.g., the CSCF/PCRFs 412-1, 412-2) detect that the SDP codec adaptation parameter/capability has been negotiated, the CSCF/PCRFs 412-1, 412-2 may send the PLR associated with the most robust mode to the local base stations 322-1, 322-2 at 542, 544. This may be based on an assumption that the UEs 302-1, 302-2 will switch to a more robust codec/mode in the event that network coverage becomes poor. Otherwise, where the SDP codec adaptation parameter/capability has not been negotiated, the CSCF/PCRFs 412-1, 412-2 may send the local base stations 322-1, 322-2 the PLR associated with the least robust mode (e.g., to assure call continuity when there is uncertainty as to whether the UEs 302-1, 302-2 will switch to a more robust codec/mode). Furthermore, this codec adaptation parameter could also be useful in general, as the CSCF/PCRFs 412-1, 412-2 could use the codec adaptation parameter to determine whether and/or when to set a maximum bit rate (MBR) to be greater than a guaranteed bit rate (GBR).

In an aspect, the network can use the SDP attributes and parameters exchanged between the two UEs 302-1 and 302-1 to calculate the maximum PLR uplink and downlink values to send to the base stations serving the UEs 302-1 and 302-1. When a session is initiated or modified, the PCF supporting the Coverage and Handoff Enhancements using Multimedia error robustness feature (CHEM) can derive the PLR_adapt and maxe2e-PLR attribute values based on attributes in both the SDP offer and/or SDP answer to determine the maximum tolerable end-to-end PLR budget distributed across the uplink and downlink in a media transport path. That is, the network receives the SDP attributes, their parameters, and values in the SDP offer and answer. Based on receiving these values it calculates the values of the maximum uplink PLR and the maximum downlink PLR. In the absence of any additional negotiation or information from the UEs, the PCF may default to distributing the maximum tolerable end-to-end PLR equally (i.e., 50-50) across the uplink and downlink or as per operator policy. Note that the PLR_adapt attribute is used in the specification for the UEs and network to negotiate the use of the CHEM feature (i.e., where the RAN delays the handoff of a UE because it can operate at a higher loss rate with its more robust codec configuration). Table 1 below describes rules for how to calculate the PLR_adapt and maxe2e-PLR attribute values at the PCF in this case. Note that the format of PLR_adapt in SDP is "a=PLR_adapt:" [SP "ALR"], and the format of maxe2e-PLR in SDP is:

MAXimum-e2e-PLR-value=payload-type SP maxe2e-PLR [":"maxDL-PLR] ["/"maxUL-PLR]
payload-type=zero-based-integer
maxe2e-PLR=plr-value
maxDL-PLR=plr-value
maxUL-PLR=plr-value
plr-value=integer.

TABLE 1

| Authorized QoS Parameter | Calculation Rule |
|---|---|
| PLR_adapt | /* Check for presence of PLR_adapt attribute for each media component */<br>IF both a= PLR_adapt: ALR is present in both SDP OFFER and ANSWER THEN<br>    /* Application layer redundancy is supported both in SDP OFFER and ANSWER */<br>    media robustness adaptation is enabled AND shall use robust handover thresholds using application layer redundancy<br>ELSE IF both a= PLR_adapt is present in both SDP OFFER and ANSWER THEN<br>    /* Application layer redundancy is not supported either in SDP OFFER or in ANSWER */<br>    media robustness adaptation is enabled AND shall use robust handover thresholds using partial redundancy<br>ELSE<br>    /* should not use robust handover thresholds in either the uplink or downlink direction */<br>    media robustness adaptation is not enabled in either direction of media transmission<br>ENDIF; |
| Maxe2e-PLR | maxe2e-PLR = maxe2e-PLR value present in corresponding SDP OFFER/ANSWER for Offering/Answering MTSI client<br>IF operator special policy exists THEN<br>    maxDL-PLR = as per operator special policy |

TABLE 1-continued

| Authorized QoS Parameter | Calculation Rule |
|---|---|
| | ELSE IF maxDL-PLR is present in the direction of media transmission<br>    maxDL-PLR = value present in the SDP OFFER/ANSWER for Offering/Answering MTSI client<br>ELSE<br>    maxDL-PLR = the default value is half maxe2e-PLR value present in the SDP OFFER/ANSWER for Offering/Answering MTSI client<br>ENDIF;<br>IF operator special policy exists THEN<br>    maxUL-PLR = as per operator special policy<br>ELSE IF maxUL-PLR is present in the direction of media transmission<br>    maxUL-PLR = value present in the SDP OFFER/ANSWER for Offering/Answering MTSI client<br>ELSE<br>    maxUL-PLR = the default value is half maxe2e-PLR value present in the SDP OFFER/ANSWER for Offering/Answering MTSI client<br>ENDIF; |

In an aspect, if the CHEM feature is supported, then from the service information PCRF provides the maximum packet loss rate(s) for uplink and/or downlink direction(s) in Max-PLR-DL and Max-PLR-DL attribute-value pair (AVP) within a charging-rule-definition AVP as per mapping rules in Table 2 below.

TABLE 2

| Max-PLR-DL/UL | Calculation Rule |
|---|---|
| Max-PLR-DL | IF a= PLR_adapt line is NOT present in both SDP OFFER and ANSWER<br>THEN<br>    /* As UE does not support CHEM feature, PCRF should not use packet loss rates in either the uplink or downlink direction */<br>    Max-PLR-DL AVP not supplied<br>ELSE<br>    IF operator special policy exists THEN<br>        Max-PLR-DL = as per operator special policy<br>    ELSE<br>        IF PCRF serving the OFFERER THEN<br>            FOR each RTP payload type of the same media line<br>                IF MAXimum-e2e-PLR line is present in the SDP OFFER THEN<br>                      IF maxUL-PLR is present in the SDP ANSWER<br>                          Max-PLR-DL = value of maxe2e-PLR in the SDP OFFER – maxUL-PLR in the SDP ANSWER<br>                      ELSE /* maxUL-PLR is not present in the SDP ANSWER */<br>                          Max-PLR-DL = the default value is half maxe2e-PLR value present in the SDP OFFER<br>                ELSE /* MAXimum-e2e-PLR line is not present in the SDP OFFER */<br>                      Max-PLR-DL = the default value is half end-to-end Maximum End-to-End Packet Loss Rate for the decoder selected for the SDP OFFERER<br>                ENDIF;<br>            END FOR LOOP of each RTP payload type of the same media<br>            Max-PLR-DL = maximum value of Max-PLR-DL among all the RTP payload types<br>        ELSE /* For PCRF serving the ANSWERER */<br>            FOR each RTP payload type of the same media line<br>                IF MAXimum-e2e-PLR line is present in the SDP ANSWER THEN<br>                      IF maxDL-PLR is present in the SDP ANSWER<br>                          Max-PLR-DL = value of maxDL-PLR in the SDP ANSWER<br>                      ELSE /* maxDL-PLR is not present in the SDP ANSWER */<br>                          Max-PLR-DL = the default value is half maxe2e-PLR value present in the SDP ANSWER<br>                ELSE /* MAXimum-e2e-PLR line is not present in the SDP ANSWER */<br>                      Max-PLR-DL = the default value is half end-to-end Maximum End-to-End Packet Loss Rate for the decoder selected for the SDP ANSWER<br>                ENDIF;<br>            END FOR LOOP of each RTP payload type of the same media<br>            Max-PLR-DL = maximum value of Max-PLR-DL among all the RTP payload types<br>        ENDIF;<br>    ENDIF;<br>ENDIF; |

TABLE 2-continued

| Max-PLR-DL/UL | Calculation Rule |
|---|---|
| Max-PLR-UL | IF a= PLR_adapt line is NOT present in both SDP OFFER and ANSWER<br>THEN<br>    /* As UE does not support CHEM feature, PCRF should not use packet loss rates in either the uplink or downlink direction */<br>    Max-PLR-UL AVP not supplied<br>ELSE<br>    IF operator special policy exists THEN<br>        Max-PLR-UL = as per operator special policy<br>    ELSE<br>        IF PCRF serving the OFFERER THEN<br>            FOR each RTP payload type of the same media line<br>                IF MAXimum-e2e-PLR line is present in the SDP ANSWER THEN<br>                    IF maxDL-PLR is present in the SDP ANSWER<br>                        Max-PLR-UL = value of maxe2e-PLR in the SDP ANSWER - maxDL-PLR in the SDP ANSWER<br>                    ELSE /* maxDL-PLR is not present in the SDP ANSWER */<br>                        Max-PLR-UL = the default value is half maxe2e-PLR value present in the SDP ANSWER<br>                ELSE /* MAXimum-e2e-PLR line is not present in the SDP ANSWER */<br>                    Max-PLR-UL = the default value is half end-to-end Maximum End-to-End Packet Loss Rate for the decoder selected for the SDP ANSWER if ALR parameter was included in PLR_adapt attribute<br>                ENDIF;<br>            END FOR LOOP of each RTP payload type of the same media<br>            Max-PLR-UL = maximum value of Max-PLR-UL among all the RTP payload types<br>        ELSE /* For PCRF serving the ANSWERER */<br>            FOR each RTP payload type of the same media line<br>                IF MAXimum-e2e-PLR line is present in the SDP OFFER THEN<br>                    IF maxUL-PLR is present in the SDP ANSWER<br>                        Max-PLR-UL = value of maxUL-PLR in the SDP ANSWER<br>                    ELSE /* maxUL-PLR is not present in the SDP ANSWER */<br>                        Max-PLR-UL = the default value is half maxe2e-PLR value present in the SDP OFFER<br>                ELSE /* MAXimum-e2e-PLR line is not present in the SDP ANSWER */<br>                    Max-PLR-UL = the default value is half end-to-end Maximum End-to-End Packet Loss Rate for the decoder selected for the SDP OFFER<br>                END IF;<br>            END FOR LOOP of each RTP payload type of the same media<br>            Max-PLR-UL = maximum value of Max-PLR-UL among all the RTP payload types<br>        ENDIF;<br>    ENDIF;<br>ENDIF; |

According to various aspects, one possible issue that may arise when using application layer redundancy (instead of the partial redundancy used in EVS channel-aware mode) to improve error robustness of the codec when at the coverage edge is that the particular configuration that the UEs 302-1, 302-2 will use when high packet loss is detected may be unknown because there are several possibilities that tradeoff between speech quality and error robustness (e.g., different PLC and/or JBM implementations, different codec/mode configuration options, etc.). As such, to handle this uncertainty, the UEs 302-1, 302-2 may be configured to indicate (e.g., in SDP) a "most robust codec configuration" supported at the respective UEs 302-1, 302-2 so that the network entities (e.g., base stations 322-1, 322-2 and CSCF/PCRFs 412-1, 412-2) may know what to expect when one or more of the UEs 302-1, 302-2 approach the coverage edge or otherwise detect increased packet loss and/or poor network coverage. The appropriate network entity(ies) can thereby set the applicable SRVCC threshold(s) according to the most robust codec configuration indicated by the respective UEs 302-1, 302-2. Furthermore, in various aspects, an operator may optionally configure one or more of the UEs 302-1, 302-2 to use a particular configuration when high packet loss is detected and this configuration may be signaled via SDP to the far end base station and UE. In an example aspect, based on the signaling from the UEs 302-1, 302-2, the base stations 322-1, 322-2 may be configured to further update or modify an SRVCC threshold(s) that was originally set based on the signaling from CSCF/PCRFs 412-1, 412-2, respectively. In another example aspect, based on the signaling from the CSCF/PCRFs 412-1, 412-2, the base stations 322-1, 322-2 may be configured to further update or modify an SRVCC threshold(s) and/or other suitable handoff threshold that was originally set based on the signaling from UEs 302-1, 302-2, respectively. In another example aspect, the base stations 322-1, 322-2 may be configured to further update or modify an SRVCC threshold(s) and/or other suitable handoff threshold based on the signaling from both the UEs 302-1, 302-2 and CSCF/PCRFs 412-1, 412-2.

Figure 6:
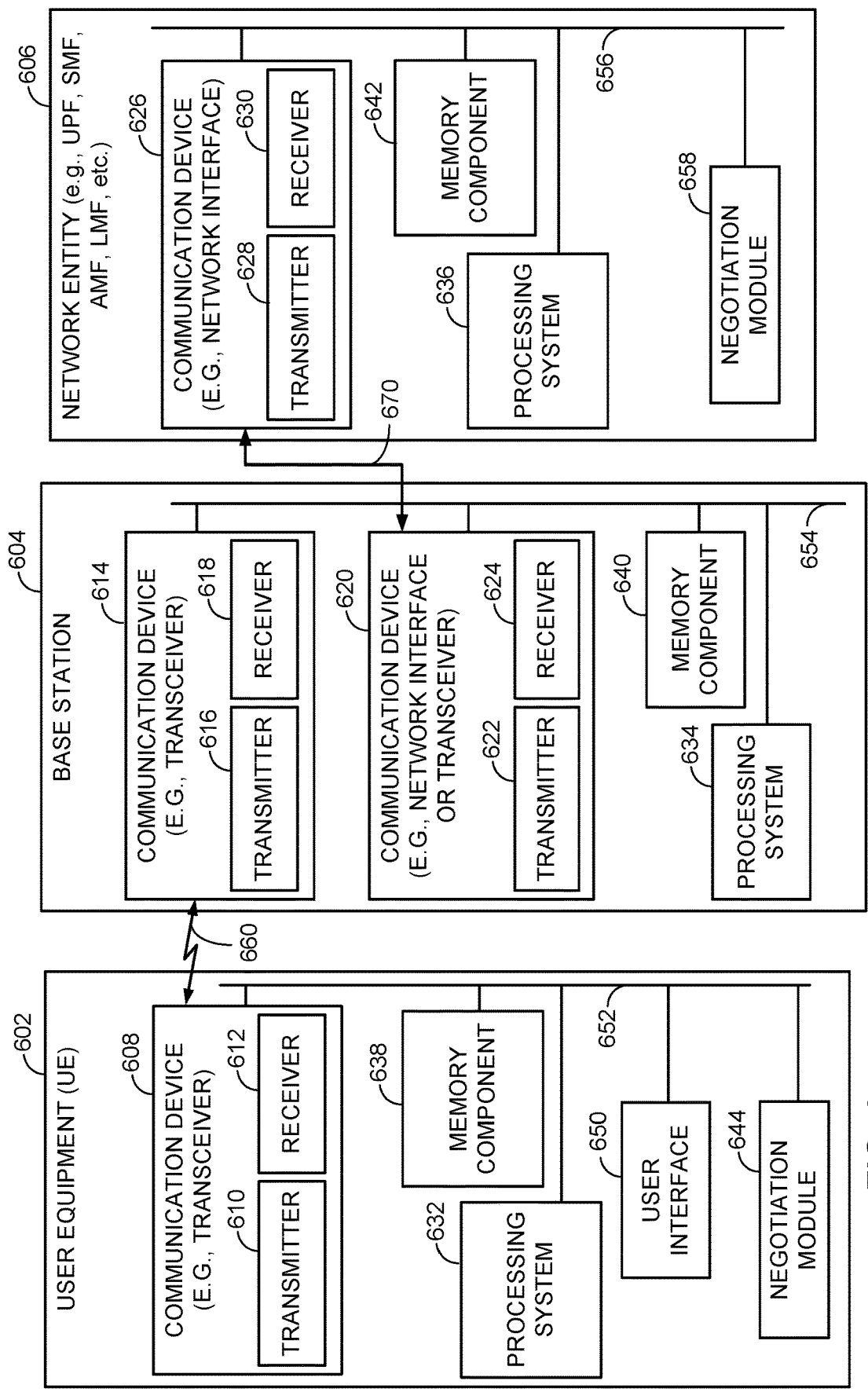
FIG. 6 illustrates exemplary apparatuses in a wireless network, according to aspects of the disclosure.

FIG. 6 illustrates several sample components (represented by corresponding blocks) that may be incorporated into a UE 602 (which may correspond to any of the UEs described herein), a base station 604 (which may correspond to any of the base stations described herein), and a network entity 606 (which may correspond to or embody any of the network functions described herein, including the location server 230 and the LMF 270) to support the negotiation operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 602 and the base station 604 each include at least one wireless communication device (represented by the communication devices 608 and 614 (and the communication device 620 if the apparatus 604 is a relay)) for communicating with other nodes via at least one designated RAT. For example, the communication devices 608 and 614 may communicate with each other over a wireless communication link 660, which may correspond to a communication link 120 in FIG. 1. Each communication device 608 includes at least one transmitter (represented by the transmitter 610) for transmitting and encoding signals (e.g., messages, indications, information, and so on) and at least one receiver (represented by the receiver 612) for receiving and decoding signals (e.g., messages, indications, information, pilots, and so on). Similarly, each communication device 614 includes at least one transmitter (represented by the transmitter 616) for transmitting signals (e.g., messages, indications, information, pilots, and so on) and at least one receiver (represented by the receiver 618) for receiving signals (e.g., messages, indications, information, and so on). If the base station 604 is a relay station, each communication device 620 may include at least one transmitter (represented by the transmitter 622) for transmitting signals (e.g., messages, indications, information, pilots, and so on) and at least one receiver (represented by the receiver 624) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 604 may also comprise a network listen module (NLM) or the like for performing various measurements.

The network entity 606 (and the base station 604 if it is not a relay station) includes at least one communication device (represented by the communication device 626 and, optionally, 620) for communicating with other nodes. For example, the communication device 626 may comprise a network interface that is configured to communicate with one or more network entities via a wire-based or wireless backhaul 670 (which may correspond to the backhaul link 122 in FIG. 1). In some aspects, the communication device 626 may be implemented as a transceiver configured to support wire-based or wireless signal communication, and the transmitter 628 and receiver 630 may be an integrated unit. This communication may involve, for example, sending and receiving: messages, parameters, or other types of information. Accordingly, in the example of FIG. 6, the communication device 626 is shown as comprising a transmitter 628 and a receiver 630. Alternatively, the transmitter 628 and receiver 630 may be separate devices within the communication device 626. Similarly, if the base station 604 is not a relay station, the communication device 620 may comprise a network interface that is configured to communicate with one or more network entities 606 via a wire-based or wireless backhaul 670. As with the communication device 626, the communication device 620 is shown as comprising a transmitter 622 and a receiver 624.

The apparatuses 602, 604, and 606 also include other components that may be used in conjunction with the file transmission operations as disclosed herein. The UE 602 includes a processing system 632 for providing functionality relating to, for example, the UE operations as described herein and for providing other processing functionality. The base station 604 includes a processing system 634 for providing functionality relating to, for example, the base station operations described herein and for providing other processing functionality. The network entity 606 includes a processing system 636 for providing functionality relating to, for example, the network function operations described herein and for providing other processing functionality. The apparatuses 602, 604, and 606 include memory components 638, 640, and 642 (e.g., each including a memory device), respectively, for maintaining information (e.g., information indicative of reserved resources, thresholds, parameters, and so on). In addition, the UE 602 includes a user interface 650 for providing indications (e.g., audible and/or visual indications) to a user and/or for receiving user input (e.g., upon user actuation of a sensing device such a keypad, a touch screen, a microphone, and so on). Although not shown, the apparatuses 604 and 606 may also include user interfaces.

Referring to the processing system 634 in more detail, in the downlink, IP packets from the network entity 606 may be provided to the processing system 634. The processing system 634 may implement functionality for an RRC layer, a packet data convergence protocol (PDCP) layer, a radio link control (RLC) layer, and a medium access control (MAC) layer. The processing system 634 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 616 and the receiver 618 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 616 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 602. Each spatial stream may then be provided to one or more different antennas. The transmitter 616 may modulate an RF carrier with a respective spatial stream for transmission.

At the UE 602, the receiver 612 receives a signal through its respective antenna(s). The receiver 612 recovers information modulated onto an RF carrier and provides the information to the processing system 632. The transmitter 610 and the receiver 612 implement Layer-1 functionality associated with various signal processing functions. The receiver 612 may perform spatial processing on the information to recover any spatial streams destined for the UE 602. If multiple spatial streams are destined for the UE 602, they may be combined by the receiver 612 into a single OFDM symbol stream. The receiver 612 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 604. These soft decisions may be based on channel estimates computed by a channel estimator. The soft decisions are then decoded and de-interleaved to recover the data and control signals that were originally transmitted by the base station 604 on the physical channel. The data and control signals are then provided to the processing system 632, which implements Layer-3 and Layer-2 functionality.

In the UL, the processing system 632 provides demultiplexing between transport and logical channels, packet reassembly, deciphering, header decompression, and control signal processing to recover IP packets from the core network. The processing system 632 is also responsible for error detection.

Similar to the functionality described in connection with the DL transmission by the base station 604, the processing system 632 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 604 may be used by the transmitter 610 to select the appropriate coding and modulation schemes, and to facilitate spatial processing. The spatial streams generated by the transmitter 610 may be provided to different antenna(s). The transmitter 610 may modulate an RF carrier with a respective spatial stream for transmission.

The UL transmission is processed at the base station 604 in a manner similar to that described in connection with the receiver function at the UE 602. The receiver 618 receives a signal through its respective antenna(s). The receiver 618 recovers information modulated onto an RF carrier and provides the information to the processing system 634.

In the UL, the processing system 634 provides demultiplexing between transport and logical channels, packet reassembly, deciphering, header decompression, control signal processing to recover IP packets from the UE 602. IP packets from the processing system 634 may be provided to the core network. The processing system 634 is also responsible for error detection.

In an aspect, the apparatuses 602 and 606 may include negotiation modules 644 and 658, respectively. The negotiation modules 644 and 658 may be hardware circuits that are part of or coupled to the processing systems 632 and 636, respectively, that, when executed, cause the apparatuses 602 and 606 to perform the functionality described herein. Alternatively, the modules 644 and 658 may be memory modules stored in the memory components 638 and 642, respectively, that, when executed by the processing systems 632 and 636, cause the apparatuses 602 and 606 to perform the functionality described herein.

For convenience, the apparatuses 602, 604, and/or 606 are shown in FIG. 6 as including various components that may be configured according to the various examples described herein. It will be appreciated, however, that the illustrated blocks may have different functionality in different designs.

The various components of the apparatuses 602, 604, and 606 may communicate with each other over data buses 652, 654, and 656, respectively. The components of FIG. 6 may be implemented in various ways. In some implementations, the components of FIG. 6 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 608, 632, 638, 644, and 650 may be implemented by processor and memory component(s) of the UE 602 (e.g., by execution of appropriate code and/or by appropriate configuration of processor components). Similarly, some or all of the functionality represented by blocks 614, 620, 634, and 640 may be implemented by processor and memory component(s) of the base station 604 (e.g., by execution of appropriate code and/or by appropriate configuration of processor components). Also, some or all of the functionality represented by blocks 626, 636, 642, and 658 may be implemented by processor and memory component(s) of the network entity 606 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE, base station, positioning entity, etc., such as the processing systems 632, 634, 636, the communication devices 608, 614, 626, the negotiation modules 644 and 658, etc.

Figure 7:
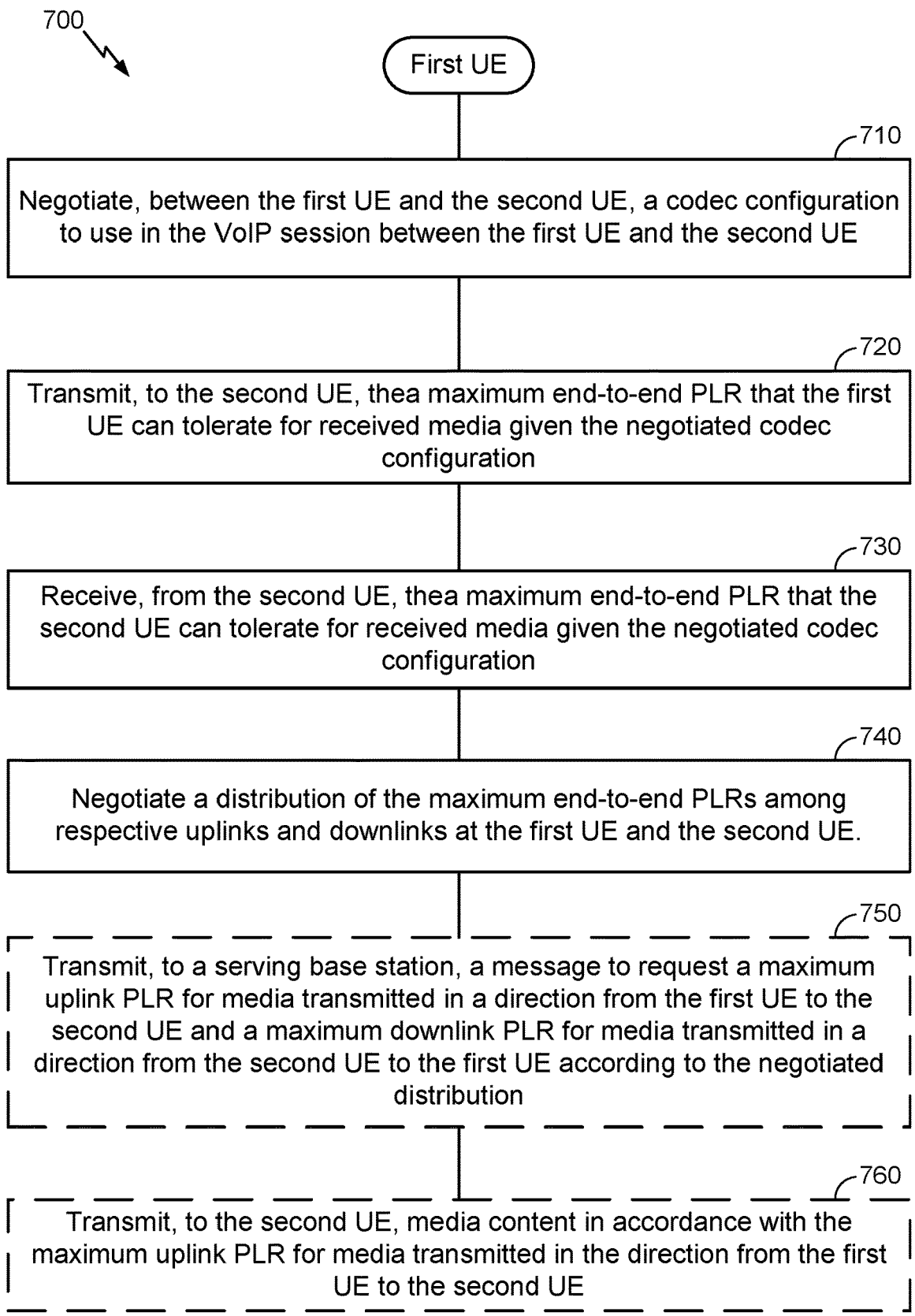
FIGS. 7 and 8 illustrate exemplary methods for increasing network coverage for a VoIP session between a first UE and a second UE, according to aspects of the disclosure.

FIG. 7 illustrates an exemplary method 700 for increasing network coverage for a VoIP session between a first UE (e.g., any of the UEs described herein) and a second UE (e.g., any of the UEs described herein), according to an aspect of the disclosure. In an aspect, the method 700 may be performed by the first UE.

At 710, the first UE negotiates, with the second UE, a codec configuration to use in the VoIP session between the first UE and the second UE. In an aspect, operation 710 may be performed by communication device 608, processing system 632, memory component 638, and/or negotiation module 644, any or all of which may be considered means for performing this operation.

At 720, the first UE transmits, to the second UE, the maximum end-to-end PLR that the first UE can tolerate for received media given the negotiated codec configuration. In an aspect, operation 720 may be performed by transmitter 610, processing system 632, memory component 638, and/or negotiation module 644, any or all of which may be considered means for performing this operation.

At 730, the first UE receives, from the second UE, a maximum end-to-end PLR that the second UE can tolerate for received media given the negotiated codec configuration. In an aspect, operation 730 may be performed by receiver 612, processing system 632, memory component 638, and/or negotiation module 644, any or all of which may be considered means for performing this operation.

At 740, the first UE negotiates a distribution of the maximum end-to-end PLRs among respective uplinks and downlinks at the first UE and the second UE. In an aspect, operation 740 may be performed by communication device 608, processing system 632, memory component 638, and/or negotiation module 644, any or all of which may be considered means for performing this operation.

At 750, the first UE optionally transmits, to a serving base station, a message to request a maximum uplink PLR for media transmitted in a direction from the first UE to the second UE and a maximum downlink PLR for media transmitted in a direction from the second UE to the first UE according to the negotiated distribution. In an aspect, operation 750 may be performed by transmitter 610, processing system 632, memory component 638, and/or negotiation module 644, any or all of which may be considered means for performing this operation.

At 760, the first UE optionally transmits, to the second UE, media in accordance with the maximum uplink PLR for media transmitted in the direction from the first UE to the second UE. In an aspect, operation 760 may be performed by transmitter 610, processing system 632, memory component 638, and/or negotiation module 644, any or all of which may be considered means for performing this operation.

Figure 8:
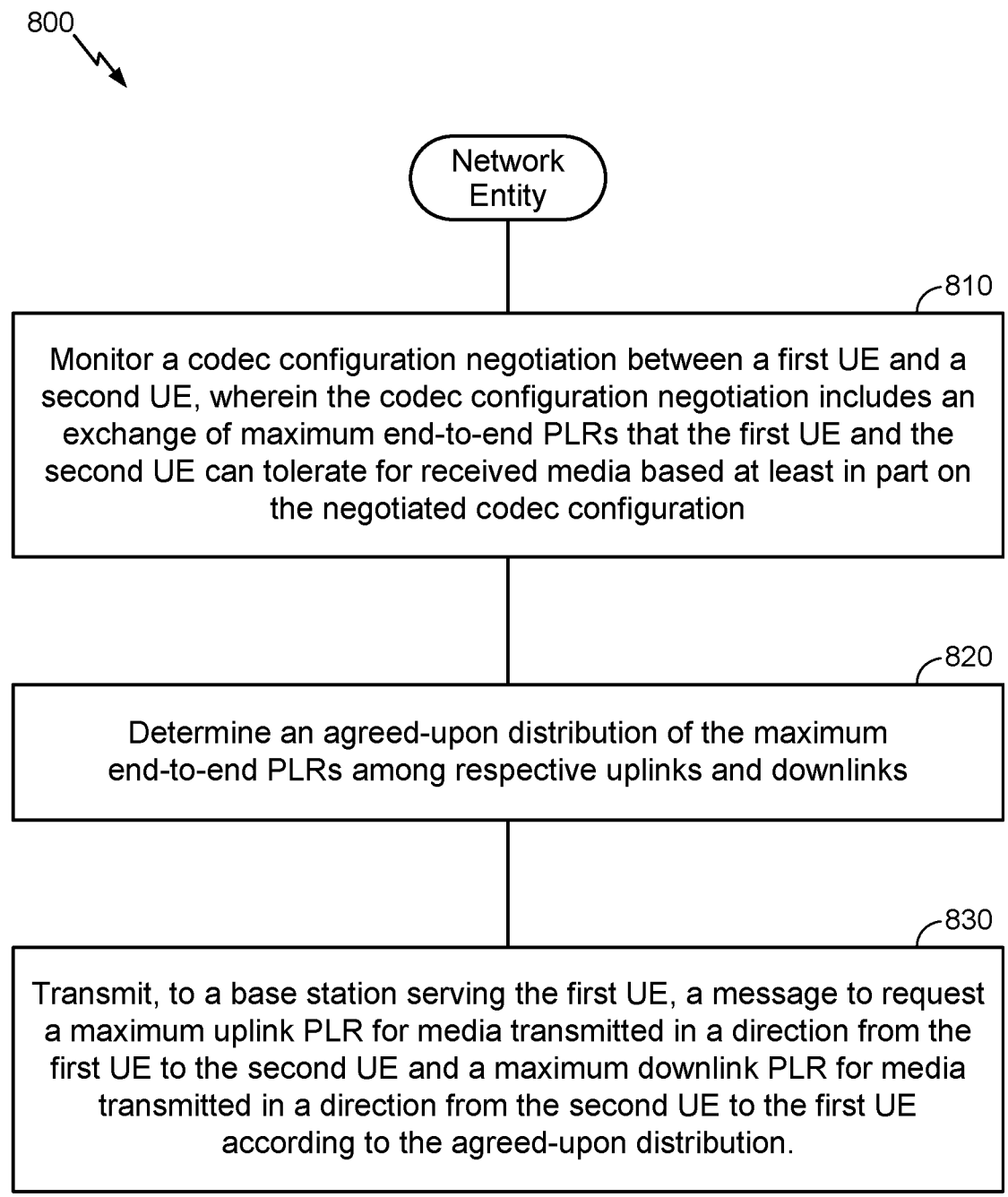

FIG. 8 illustrates an exemplary method 800 for increasing network coverage for a VoIP session between a first UE (e.g., any of the UEs described herein) and a second UE (e.g., any of the UEs described herein), according to an aspect of the disclosure. The method 800 may be performed by a network entity (e.g., CSCF/PCRFs 412-1, 412-2) serving the first UE.

At 810, the network entity monitors a codec configuration negotiation between the first UE and the second UE, wherein the codec configuration negotiation includes an exchange of maximum end-to-end PLRs that the first UE and the second UE can tolerate for received media based at least in part on the negotiated codec configuration. In an aspect, operation 810 may be performed by communication device 626, processing system 636, memory component 642, and/or negotiation module 658, any or all of which may be considered means for performing this operation.

At 820, the network entity determines an agreed-upon distribution of the maximum end-to-end PLRs among respective uplinks and downlinks. In an aspect, operation 820 may be performed by communication device 626, processing system 636, memory component 642, and/or negotiation module 658, any or all of which may be considered means for performing this operation.

At 830, the network entity transmits, to a base station serving the first UE, a message to request a maximum uplink PLR for media transmitted in a direction from the first UE to the second UE and a maximum downlink PLR for media transmitted in a direction from the second UE to the first UE according to the agreed-upon distribution. In an aspect, operation 830 may be performed by transmitter 628, processing system 636, memory component 642, and/or negotiation module 658, any or all of which may be considered means for performing this operation.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a UE. In the alternative, the processor and the non-transitory computer-readable medium may be discrete components in a UE.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes compact disc (CD), laser disc, optical disc, digital video disc (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any of the methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for increasing network coverage for a Voice-over-Internet Protocol (VoIP) session between a first user equipment (UE) and a second UE, comprising:
    negotiating, between the first UE and the second UE, a codec configuration to use in the VoIP session between the first UE and the second UE;
    transmitting, by the first UE to the second UE, a maximum end-to-end packet loss rate (PLR) that the first UE can tolerate for received media given the negotiated codec configuration;
    receiving, at the first UE from the second UE, a maximum end-to-end PLR that the second UE can tolerate for received media given the negotiated codec configuration; and
    negotiating, at the first UE, a distribution of the maximum end-to-end PLRs among respective uplinks and downlinks at the first UE and the second UE, wherein negotiating the distribution of the maximum end-to-end PLRs among the respective uplinks and downlinks comprises:
        receiving, at the first UE from the second UE, an offer that includes the maximum end-to-end PLR that the second UE can tolerate for received media, a proposed maximum uplink PLR to be requested from a serving base station of the second UE, and a proposed maximum downlink PLR to be requested from the serving base station of the second UE; and
        transmitting, by the first UE to the second UE, an answer indicating at least the maximum end-to-end PLR that the first UE can tolerate for received media, an agreed maximum downlink PLR to be requested from a serving base station of the first UE, and an agreed maximum uplink PLR to be requested from the serving base station of the first UE, wherein, based on the proposed maximum uplink PLR included in the offer being less than half the maximum end-to-end PLR that the first UE can tolerate, the agreed maximum downlink PLR included in the answer is no greater than the maximum end-to-end PLR that the first UE can tolerate minus the proposed maximum uplink PLR.

2. The method of claim 1, further comprising:
    transmitting, by the first UE to a serving base station, a message to request a maximum uplink PLR for media transmitted in a direction from the first UE to the second UE and a maximum downlink PLR for media transmitted in a direction from the second UE to the first UE according to the negotiated distribution.

3. The method of claim 2, further comprising:
    transmitting, from the first UE to the second UE, media content in accordance with the maximum uplink PLR for media transmitted in the direction from the first UE to the second UE.

4. The method recited in claim 2, wherein the serving base station is configured to establish a handover threshold for the VoIP session based at least in part on the requested maximum uplink PLR and the requested maximum downlink PLR.

5. The method recited in claim 3, wherein the handover threshold comprises a single radio voice call continuity (SRVCC) threshold.

6. The method of claim 1, wherein the maximum end-to-end PLRs are further based on respective packet loss concealment (PLC) and jitter buffer management (JBM) implementations in use at the first UE and the second UE.

7. The method of claim 1, wherein the first UE and the second UE are configured to negotiate the distribution of the maximum end-to-end PLRs among the respective uplinks and downlinks via session description protocol (SDP).

8. The method recited in claim 1, wherein, based on the proposed maximum uplink PLR included in the offer being no less than half the maximum end-to-end PLR that the first UE can tolerate, the agreed maximum downlink PLR included in the answer is not greater than half the maximum end-to-end PLR that the first UE can tolerate.

9. The method recited in claim 1, wherein, based on the proposed maximum downlink PLR included in the offer being less than half the maximum end-to-end PLR that the second UE can tolerate, the agreed maximum uplink PLR included in the answer is not greater than the maximum end-to-end PLR that the second UE can tolerate minus the proposed maximum downlink PLR.

10. The method recited in claim 1, wherein, based on the proposed maximum downlink PLR included in the offer being greater than or equal to half the maximum end-to-end PLR that the second UE can tolerate, the agreed maximum uplink PLR included in the answer is no greater than half the maximum end-to-end PLR that the second UE can tolerate.

11. The method of claim 1, wherein the proposed maximum uplink PLR and the proposed maximum downlink PLR requested from the serving base station of the second UE equal the agreed maximum uplink PLR and the agreed maximum downlink PLR, respectively.

12. The method of claim 7, wherein negotiating the distribution of the maximum end-to-end PLRs among the respective uplinks and downlinks comprises:
transmitting, by the first UE to the second UE, an SDP offer that includes the maximum end-to-end PLR that the first UE can tolerate for received media, a proposed maximum uplink PLR to be requested from a serving base station of the first UE, and a proposed maximum downlink PLR to be requested from the serving base station of the first UE; and
receiving, at the first UE from the second UE, an SDP answer indicating at least the maximum end-to-end PLR that the second UE can tolerate for received media, an agreed maximum downlink PLR to be requested from a serving base station of the second UE, and an agreed maximum uplink PLR to be requested from the serving base station of the second UE.

13. A method for increasing network coverage for a Voice-over-Internet Protocol (VoIP) session between a first user equipment (UE) and a second UE, comprising:
monitoring, by a network entity serving the first UE, a codec configuration negotiation between the first UE and the second UE, wherein the codec configuration negotiation includes an exchange of maximum end-to-end packet loss rates (PLRs) that the first UE and the second UE can tolerate for received media based at least in part on the negotiated codec configuration;
determining, by the network entity, an agreed-upon distribution of the maximum end-to-end PLRs among respective uplinks and downlinks; and
transmitting, by the network entity to a base station serving the first UE, a message to request a maximum uplink PLR for media transmitted in a direction from the first UE to the second UE and a maximum downlink PLR for media transmitted in a direction from the second UE to the first UE based, at least in part, on a maximum end-to-end PLR that the second UE can tolerate for received media included in an offer to the first UE from the second UE and a maximum end-to-end PLR that the first UE can tolerate for received media included in an answer to the second UE from the first UE, wherein, based on a proposed maximum uplink PLR included in the SDP offer being less than half the maximum end-to-end PLR that the first UE can tolerate, an agreed maximum downlink PLR to be requested from a serving base station of the first UE included in the SDP answer is no greater than the maximum end-to-end PLR that the first UE can tolerate minus the proposed maximum uplink PLR.

14. The method of claim 13, wherein the maximum end-to-end PLRs are further based on respective packet loss concealment (PLC) and jitter buffer management (JBM) implementations in use at the first UE and the second UE.

15. The method recited in claim 13, wherein determining the maximum end-to-end PLRs that the first UE and the second UE can tolerate for received media comprises:
transmitting, to the second UE from the first UE, the maximum end-to-end PLR that the first UE can tolerate for received media given the negotiated codec configuration; and
transmitting, to the first UE from the second UE, the maximum end-to-end PLR that the second UE can tolerate for received media given the negotiated codec configuration.

16. The method of claim 13, wherein the first UE and the second UE are configured to negotiate the agreed-upon distribution of the maximum end-to-end PLRs among the respective uplinks and downlinks via session description protocol (SDP).

17. The method of claim 16, wherein determining the distribution of the maximum end-to-end PLRs among the respective uplinks and downlinks comprises:
transmitting, to the first UE from the second UE, an SDP offer that includes the maximum end-to-end PLR that the second UE can tolerate for received media, the proposed maximum uplink PLR to be requested from a serving base station of the second UE, and a proposed maximum downlink PLR to be requested from the serving base station of the second UE; and
transmitting, to the second UE from the first UE, an SDP answer indicating at least the maximum end-to-end PLR that the first UE can tolerate for received media, the agreed maximum downlink PLR to be requested from the serving base station of the first UE, and an agreed maximum uplink PLR to be requested from the serving base station of the first UE.

18. The method recited in claim 17, wherein, based on the proposed maximum uplink PLR included in the SDP offer being no less than half the maximum end-to-end PLR that the first UE can tolerate, the agreed maximum downlink PLR included in the SDP answer is not greater than half the maximum end-to-end PLR that the first UE can tolerate.

19. The method recited in claim 17, wherein, based on the proposed maximum downlink PLR included in the SDP offer being less than half the maximum end-to-end PLR that the second UE can tolerate, the agreed maximum uplink PLR included in the SDP answer is not greater than the maximum end-to-end PLR that the second UE can tolerate minus the proposed maximum downlink PLR.

20. The method recited in claim 17, wherein, based on the proposed maximum downlink PLR included in the SDP offer being greater than or equal to half the maximum end-to-end PLR that the second UE can tolerate, the agreed maximum uplink PLR included in the SDP answer is no greater than half the maximum end-to-end PLR that the first UE can tolerate.

21. The method of claim 17, wherein the proposed maximum uplink PLR and the proposed maximum downlink PLR requested from the serving base station of the second UE equal the agreed maximum uplink PLR and the agreed maximum downlink PLR, respectively.

22. The method of claim 16, wherein determining the agreed-upon distribution of the maximum end-to-end PLRs among the respective uplinks and downlinks comprises:
   transmitting, to the second UE from the first UE, an SDP offer that includes the maximum end-to-end PLR that the first UE can tolerate for received media, the proposed maximum uplink PLR to be requested from a serving base station of the first UE, and a proposed maximum downlink PLR to be requested from the serving base station of the first UE; and
   transmitting, to the first UE from the second UE, an SDP answer indicating at least the maximum end-to-end PLR that the second UE can tolerate for received media, the agreed maximum downlink PLR to be requested from the serving base station of the second UE, and an agreed maximum uplink PLR to be requested from the serving base station of the second UE.

23. The method recited in claim 13, wherein a serving base station of the first UE is configured to establish a handover threshold for the VoIP session based at least in part on the requested maximum uplink PLR and the requested maximum downlink PLR.

24. The method of claim 13, wherein determining the agreed-upon distribution of the maximum end-to-end PLRs comprises:
   deriving PLR_adapt and maxe2e-PLR attribute values based on attributes in an SDP offer and/or an SDP answer transmitted by the first UE and the second UE; and
   determining the agreed-upon distribution of the maximum end-to-end PLRs based on the PLR_adapt and maxe2e-PLR attribute values and maximum end-to-end PLR uplink and downlink parameter values in an SDP answer from the first UE or the second UE.

25. The method recited in claim 20, wherein the handover threshold comprises a single radio voice call continuity (SRVCC) threshold.

26. An apparatus for increasing network coverage for a Voice-over-Internet Protocol (VoIP) session between a first user equipment (UE) and a second UE, comprising:
   a memory of the first UE;
   a communication device of the UE; and
   at least one processor of the first UE coupled to the memory, the at least one processor configured to:
      negotiate, with the second UE, a codec configuration to use in the VoIP session between the first UE and the second UE;
      cause the communication device to transmit, to the second UE, a maximum end-to-end packet loss rate (PLR) that the first UE can tolerate for received media given the negotiated codec configuration;
      receive, from the second UE via the communication device, a maximum end-to-end PLR that the second UE can tolerate for received media given the negotiated codec configuration; and
      negotiate a distribution of the maximum end-to-end PLRs among respective uplinks and downlinks at the first UE and the second UE, wherein the at least one processor configured to negotiate the distribution of the maximum end-to-end PLRs among the respective uplinks and downlinks comprises the at least one processor configured to:
         receive, from the second UE via the communication device, an offer that includes the maximum end-to-end PLR that the second UE can tolerate for received media, a proposed maximum uplink PLR to be requested from a serving base station of the second UE, and a proposed maximum downlink PLR to be requested from the serving base station of the second UE; and
         cause the communication device to transmit, to the second UE, an answer indicating at least the maximum end-to-end PLR that the first UE can tolerate for received media, an agreed maximum downlink PLR to be requested from a serving base station of the first UE, and an agreed maximum uplink PLR to be requested from the serving base station of the first UE, wherein, based on the proposed maximum uplink PLR included in the offer being less than half the maximum end-to-end PLR that the first UE can tolerate, the agreed maximum downlink PLR included in the answer is no greater than the maximum end-to-end PLR that the first UE can tolerate minus the proposed maximum uplink PLR.

27. An apparatus for increasing network coverage for a Voice-over-Internet Protocol (VoIP) session between a first user equipment (UE) and a second UE, comprising:
   a memory of a network entity serving the first UE; and
   at least one processor of the network entity coupled to the memory, the at least one processor configured to:
      monitor a codec configuration negotiation between the first UE and the second UE, wherein the codec configuration negotiation includes an exchange of maximum end-to-end packet loss rates (PLRs) that the first UE and the second UE can tolerate for received media based at least in part on the negotiated codec configuration;
      determine an agreed-upon distribution of the maximum end-to-end PLRs among respective uplinks and downlinks; and
      cause a communication device of the network entity to transmit, to a base station serving the first UE, a message to request a maximum uplink PLR for media transmitted in a direction from the first UE to the second UE and a maximum downlink PLR for media transmitted in a direction from the second UE to the first UE based, at least in part, on a maximum end-to-end PLR that the second UE can tolerate for received media included in an offer to the first UE from the second UE and a maximum end-to-end PLR that the first UE can tolerate for received media included in an answer to the second UE from the first UE, wherein, based on a proposed maximum uplink PLR included in the SDP offer being less than half the maximum end-to-end PLR that the first UE can tolerate, an agreed maximum downlink PLR to be requested from a serving base station of the first UE included in the SDP answer is no greater than the maximum end-to-end PLR that the first UE can tolerate minus the proposed maximum uplink PLR.

28. An apparatus for increasing network coverage for a Voice-over-Internet Protocol (VoIP) session between a first user equipment (UE) and a second UE, comprising:

means of the first UE for negotiating, with the second UE, a codec configuration to use in the VoIP session between the first UE and the second UE;

means of the first UE for transmitting, to the second UE, a maximum end-to-end packet loss rate (PLR) that the first UE can tolerate for received media given the negotiated codec configuration;

means of the first UE for receiving, from the second UE, a maximum end-to-end PLR that the second UE can tolerate for received media given the negotiated codec configuration; and means of the first UE for negotiating a distribution of the maximum end-to-end PLRs among respective uplinks and downlinks at the first UE and the second UE, wherein the means of the first UE for negotiating the distribution of the maximum end-to-end PLRs among the respective uplinks and downlinks comprises:

means for receiving, from the second UE, an offer that includes the maximum end-to-end PLR that the second UE can tolerate for received media, a proposed maximum uplink PLR to be requested from a serving base station of the second UE, and a proposed maximum downlink PLR to be requested from the serving base station of the second UE; and means for transmitting, to the second UE, an answer indicating at least the maximum end-to-end PLR that the first UE can tolerate for received media, an agreed maximum downlink PLR to be requested from a serving base station of the first UE, and an agreed maximum uplink PLR to be requested from the serving base station of the first UE, wherein, based on the proposed maximum uplink PLR included in the offer being less than half the maximum end-to-end PLR that the first UE can tolerate, the agreed maximum downlink PLR included in the answer is no greater than the maximum end-to-end PLR that the first UE can tolerate minus the proposed maximum uplink PLR.

29. An apparatus for increasing network coverage for a Voice-over-Internet Protocol (VoIP) session between a first user equipment (UE) and a second UE, comprising:

means of a network entity serving the first UE for monitoring a codec configuration negotiation between the first UE and the second UE, wherein the codec configuration negotiation includes an exchange of maximum end-to-end packet loss rates (PLRs) that the first UE and the second UE can tolerate for received media based at least in part on the negotiated codec configuration;

means of the network entity for determining an agreed-upon distribution of the maximum end-to-end PLRs among respective uplinks and downlinks; and means of the network entity for transmitting, to a base station serving the first UE, a message to request a maximum uplink PLR for media transmitted in a direction from the first UE to the second UE and a maximum downlink PLR for media transmitted in a direction from the second UE to the first UE based, at least in part, on a maximum end-to-end PLR that the second UE can tolerate for received media included in an offer to the first UE from the second UE and a maximum end-to-end PLR that the first UE can tolerate for received media included in an answer to the second UE from the first UE, wherein, based on a proposed maximum uplink PLR included in the SDP offer being less than half the maximum end-to-end PLR that the first UE can tolerate, an agreed maximum downlink PLR to be requested from a serving base station of the first UE included in the SDP answer is no greater than the maximum end-to-end PLR that the first UE can tolerate minus the proposed maximum uplink PLR.

30. A non-transitory computer-readable medium storing computer-executable instructions for increasing network coverage for a Voice-over-Internet Protocol (VoIP) session between a first user equipment (UE) and a second UE, the computer-executable instructions comprising:

at least one instruction instructing the first UE to negotiate, with the second UE, a codec configuration to use in the VoIP session between the first UE and the second UE;

at least one instruction instructing the first UE to transmit, to the second UE, a maximum end-to-end packet loss rate (PLR) that the first UE can tolerate for received media given the negotiated codec configuration;

at least one instruction instructing the first UE to receive, from the second UE, a maximum end-to-end PLR that the second UE can tolerate for received media given the negotiated codec configuration; and at least one instruction instructing the first UE to negotiate a distribution of the maximum end-to-end PLRs among respective uplinks and downlinks at the first UE and the second UE, wherein the at least one instruction instructing the first UE to negotiate the distribution of the maximum end-to-end PLRs among the respective uplinks and downlinks comprises:

at least one instruction instructing the first UE to receive, from the second UE, an offer that includes the maximum end-to-end PLR that the second UE can tolerate for received media, a proposed maximum uplink PLR to be requested from a serving base station of the second UE, and a proposed maximum downlink PLR to be requested from the serving base station of the second UE; and at least one instruction instructing the first UE to transmit, to the second UE, an answer indicating at least the maximum end-to-end PLR that the first UE can tolerate for received media, an agreed maximum downlink PLR to be requested from a serving base station of the first UE, and an agreed maximum uplink PLR to be requested from the serving base station of the first UE, wherein, based on the proposed maximum uplink PLR included in the offer being less than half the maximum end-to-end PLR that the first UE can tolerate, the agreed maximum downlink PLR included in the answer is no greater than the maximum end-to-end PLR that the first UE can tolerate minus the proposed maximum uplink PLR.

31. A non-transitory computer-readable medium storing computer-executable instructions for increasing network coverage for a Voice-over-Internet Protocol (VoIP) session between a first user equipment (UE) and a second UE, the computer-executable instructions comprising:

at least one instruction instructing a network entity serving the first UE to monitor a codec configuration negotiation between the first UE and the second UE, wherein the codec configuration negotiation includes an exchange of maximum end-to-end packet loss rates (PLRs) that the first UE and the second UE can tolerate for received media based at least in part on the negotiated codec configuration;

at least one instruction instructing the network entity to determine an agreed-upon distribution of the maximum end-to-end PLRs among respective uplinks and downlinks; and at least one instruction instructing the network entity to transmit, to a base station serving the first UE, a message to request a maximum uplink PLR for media transmitted in a direction from the first UE to the second UE and a maximum downlink PLR for media transmitted in a direction from the second UE to the first UE based, at least in part, on a maximum end-to-end PLR that the second UE can tolerate for received media included in an offer to the first UE from the second UE and a maximum end-to-end PLR that the first UE can tolerate for received media included in an answer to the second UE from the first UE, wherein, based on a proposed maximum uplink PLR included in the SDP offer being less than half the maximum end-to-end PLR that the first UE can tolerate, an agreed maximum downlink PLR to be requested from a serving base station of the first UE included in the SDP answer is no greater than the maximum end-to-end PLR that the first UE can tolerate minus the proposed maximum uplink PLR.

* * * * *